United States Patent
Yamauchi

(10) Patent No.: US 8,269,426 B2
(45) Date of Patent: *Sep. 18, 2012

(54) LIGHT SOURCE APPARATUS, PROJECTOR, AND LIGHT SOURCE APPARATUS DRIVE METHOD

(75) Inventor: Kentaro Yamauchi, Ashiya (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 13/162,857

(22) Filed: Jun. 17, 2011

(65) Prior Publication Data

US 2011/0241565 A1    Oct. 6, 2011

Related U.S. Application Data

(63) Continuation of application No. 12/252,191, filed on Oct. 15, 2008, now Pat. No. 8,018,178.

(30) Foreign Application Priority Data

Oct. 16, 2007 (JP) ................................. 2007-268700
Jun. 26, 2008 (JP) ................................. 2008-167386

(51) Int. Cl.
H05B 41/36 (2006.01)

(52) U.S. Cl. ..... 315/291; 315/224; 315/246; 315/209 R; 353/85; 353/98

(58) Field of Classification Search .............. 315/49–63, 315/209 R, 224, 225, 246, 29, 307; 353/98, 353/85

See application file for complete search history.

(56) References Cited

U.S. PATENT DOCUMENTS

| 6,215,252 | B1 | 4/2001 | Stanton |
| 6,545,430 | B2 | 4/2003 | Ono et al. |
| 6,586,892 | B2 | 7/2003 | Derra et al. |
| 6,781,328 | B2 | 8/2004 | Horiuchi et al. |
| 6,788,009 | B2 | 9/2004 | Fujii et al. |
| 7,274,157 | B2 | 9/2007 | Hirata et al. |
| 7,638,945 | B2 | 12/2009 | Takata |
| 7,800,314 | B2 | 9/2010 | Yamauchi et al. |
| 7,830,098 | B2 | 11/2010 | Yamauchi et al. |
| 7,999,490 | B2* | 8/2011 | Terashima et al. ............ 315/291 |
| 2002/0011803 | A1 | 1/2002 | Derra et al. |

(Continued)

FOREIGN PATENT DOCUMENTS

CN     1336783 A    2/2002

(Continued)

OTHER PUBLICATIONS

Apr. 21, 2010 European Search Report issued in EP 08 25 3349.

(Continued)

*Primary Examiner* — Vibol Tan
(74) *Attorney, Agent, or Firm* — Oliff & Berridge, PLC

(57) ABSTRACT

A light source apparatus includes an arc tube having a first electrode and a second electrode that carry out an emission of light due to a discharge between them, and a drive that, when supplying energy in an alternating current to the first electrode and the second electrode, carries out a steady operation supplying a steady energy to the first electrode and the second electrode, and an initial operation making a cumulative energy supplied to at least one electrode, of the first electrode and the second electrode, in an anode period of the relevant electrode, prior to the steady period, greater than during the steady period.

9 Claims, 22 Drawing Sheets

U.S. PATENT DOCUMENTS

| | | |
|---|---|---|
| 2005/0023993 A1 | 2/2005 | Ono et al. |
| 2006/0012316 A1 | 1/2006 | Hirata et al. |
| 2006/0055341 A1 | 3/2006 | Watanabe et al. |
| 2006/0066261 A1 | 3/2006 | Rahmane et al. |
| 2009/0085495 A1 | 4/2009 | Yamauchi et al. |
| 2009/0256491 A1 | 10/2009 | Bruckel et al. |

FOREIGN PATENT DOCUMENTS

| | | |
|---|---|---|
| DE | 10 2005 049 582 A1 | 4/2007 |
| EP | 1 458 010 A2 | 9/2004 |
| EP | 1 624 733 A2 | 2/2006 |
| EP | 2 043 409 A2 | 4/2009 |
| JP | A-2002-534766 | 10/2002 |
| JP | A-2003-168369 | 6/2003 |
| JP | A-2005-19141 | 1/2005 |
| JP | A-2005-353343 | 12/2005 |
| JP | A-2006-32017 | 2/2006 |
| JP | B2-3840054 | 11/2006 |
| JP | A-2009-76419 | 4/2009 |
| JP | A-2009-87624 | 4/2009 |

OTHER PUBLICATIONS

Extended European Search Report issued in EP Application No. 08253349.8 on Jan. 14, 2011.

* cited by examiner

LIGHT SOURCE APPARATUS, PROJECTOR, AND LIGHT SOURCE APPARATUS DRIVE METHOD

This is a Division of application Ser. No. 12/252,191 filed Oct. 15, 2008. The disclosure of the prior application is hereby incorporated by reference herein in its entirety. This application claims priority from Japanese Patent Application No. 2007-268700 filed in the Japanese Patent Office on Oct. 16, 2007, and Japanese Patent Application No. 2008-167386 filed in the Japanese Patent Office on Jun. 26, 2008, the entire disclosures of which are hereby incorporated by reference in their entirety.

BACKGROUND

1. Technical Field

The present invention relates to a light source apparatus equipped with a discharge lamp having a pair of electrodes, and a drive method thereof, as well as a projector in which such a light source apparatus is embedded.

2. Related Art

An electrode of an ultra-high pressure mercury lamp embedded in a discharge light emitting type light source apparatus erodes as a lit time elapses, a length and a position of an arc changes, and an origin of a discharge is not stable in one place, causing a flicker. In order to remedy this, a technology of smoothing out a surface and newly forming a projection thereon, by temporarily making a current magnitude larger at a steady time and fusing an electrode leading extremity, has been known (refer to Japanese Patent No. 3840054).

However, when changing a current value during a lighting operation with a steady power, as an illuminance of a light source changes along with it, a brightness of a projection image changes, and there is a danger of having an adverse effect on a performance as a video instrument. Also, the electrode leading extremity being of a comparatively normal shape at a stage at which an aging has not progressed too far, carrying out the fusion of the electrode leading extremity at this time results in making the arc length unnecessarily long.

SUMMARY

An advantage of some aspects of the invention is to provide a light source apparatus, and a drive method thereof, which enable an improving of a condition of an electrode while inhibiting an occurrence of an illuminance fluctuation during the lighting operation with the steady power.

Another advantage of some aspects of the invention is to provide a projector in which the heretofore described light source apparatus is embedded.

A light source device according to an aspect of the invention includes (a) an arc tube having a first electrode and a second electrode that carry out an emission of light due to a discharge between them, and (b) a drive that carries out a steady operation supplying a steady energy to the first electrode and the second electrode and, before carrying out the steady operation, carries out an initial operation supplying energy to the first electrode and the second electrode, with an operation differing from the steady operation. (b1) The drive, in the initial operation, carries out a fusing drive making a volume of a fused portion of a leading extremity side of at least one electrode, of the first electrode and the second electrode, greater than a volume of the fused portion of the leading extremity side of the at least one electrode at a time of a rated drive during the steady operation.

With the heretofore described light source apparatus, the drive can carry out a fusing drive, in the initial operation, melting a leading extremity side of at least one electrode, of the first electrode and the second electrode. With the fusing drive, at any timing during the initial operation, as the volume of the fused portion of the leading extremity side of at least one electrode is made greater than the volume of the fused portion of the leading extremity side of the at least one electrode at the time of the rated drive during the steady operation, a repair or a restoration of the electrode utilizing a lighting start period is possible. That is, it being possible, with the fusing drive during the initial operation, to melt and smooth out a surface of a protruding leading extremity formed on a leading extremity side of one electrode, and of a leading extremity side area on a periphery thereof, it is possible to suppress an occurrence of a flicker and an arc jump. Also, with the fusing drive during the initial operation, it being possible to reproduce the protruding leading extremity along with melting and smoothing out the protruding leading extremity formed on the leading extremity side of one electrode, and the periphery thereof, it is possible to suppress an occurrence of a flicker and an arc jump. As a result, as well as being possible to maintain an illuminance of an illumination light from the light source apparatus, it is possible to lengthen a life span of the light source apparatus. According to the above, as the fusion volume of the electrode is increased without interrupting or changing the steady operation, it is possible to prevent a brightness of a source light or projection image from fluctuating due to the fusing drive during the steady operation.

Also, according to a specific aspect or standpoint of the invention, the fusing drive of the initial operation and the rated drive of the steady operation both supplying energy in an alternating current to the first electrode and the second electrode, by a cumulative energy supplied to at least one electrode, in an anode period of the relevant at least one electrode, at a time of the fusing drive of the initial operation being made greater than a cumulative energy supplied to the at least one electrode, in the anode period of the relevant at least one electrode, at a time of the rated drive during the steady period, the volume of the fused portion is increased. In this case, by relatively increasing the cumulative energy supplied in the anode period of at least one electrode at the time of the fusing drive, compared with at the time of the rated drive, it being possible to reliably increase a temperature of the leading extremity of the at least one electrode, it is possible to increase the volume of the fused portion of the leading extremity side to a desired extent. In the event that it were possible, by an adjustment of the cumulative energy supplied in the anode period of the at least one electrode, to increase a maximum temperature of the leading extremity of the at least one electrode, it can be supposed that it would be possible to increase the volume of the fused portion thereof. Furthermore, in the event that it were possible, by an adjustment of the cumulative energy, to increase an average temperature during the anode period of the relevant at least one electrode, it can be supposed that it would be possible to increase the volume of the fused portion thereof.

Also, according to a specific aspect or standpoint of the invention, a regular initial drive and the fusing drive of the initial operation, and the rated drive of the steady operation, all supplying energy in an alternating current to the first electrode and the second electrode, by a cumulative energy supplied to the leading extremity of at least one electrode, when the relevant at least one electrode is the anode, at the time of the fusing drive of the initial operation being made greater than a cumulative energy supplied to the leading extremity of the at least one electrode at the time of the rated drive during the steady period, the volume of the fused portion is increased. In this case, by relatively increasing the cumulative energy supplied to the leading extremity of the at least one electrode, compared with at the time of the rated drive, it being possible to reliably increase the temperature of the leading extremity of the at least one electrode, it is possible to increase the volume of the fused portion of the leading extremity side to a desired extent. In the event that it were possible, by an adjustment of the cumulative energy supplied to the at least one electrode in a latter half of the anode period of the at least one electrode, to increase the maximum temperature of the leading extremity of the at least one electrode, it can be supposed that it would be possible to increase the volume of the fused portion thereof. Furthermore, in the event that it were possible, by an adjustment of the cumulative energy supplied in the latter half of the anode period of the at least one electrode, to increase an average temperature during one cycle, it can be supposed that it would be possible to increase the volume of the fused portion thereof.

Also, according to another aspect of the invention, the fusing drive of the initial operation and the rated drive of the steady operation both supplying energy in an alternating current to the first electrode and the second electrode, by a maximum value of a current supplied in an anode period of at least one electrode, at the time of the fusing drive of the initial operation, being made greater than a maximum value of a current supplied in an anode period of the at least one electrode at the time of the rated drive during the steady period, the volume of the fused portion is increased. In this case, by relatively increasing the maximum value of the current supplied in the anode period of at least one electrode at the time of the fusing drive, compared with at the time of the rated drive, it being possible to reliably increase the temperature of the leading extremity of the at least one electrode, it is possible to increase the volume of the fused portion of the leading extremity side to a desired extent. In the event that it were possible, by an adjustment of the maximum value of the current supplied in the anode period of the at least one electrode, to increase the maximum temperature of the leading extremity of the at least one electrode, it can be supposed that it would be possible to increase the volume of the fused portion thereof. Furthermore, in the event that it were possible, by an adjustment of the maximum value of the current supplied in the anode period of the at least one electrode, to increase the average temperature during the anode period of the relevant at least one electrode, or during one cycle, it can be supposed that it would be possible to increase the volume of the fused portion thereof.

According to still another aspect of the invention, the drive, in a launching operation period including at least a period immediately before switching to the steady period, during the time of the fusing drive of the initial operation, increases a value of a current supplied to the at least one electrode as time elapses. In this case, the temperature of the at least one electrode gradually increasing during the launching operation period, it is possible to increase the volume of the fused portion of the leading extremity side of the relevant at least one electrode.

According to still another aspect of the invention, the light source apparatus further including an evaluating portion that determines a degree of erosion of the arc tube, the drive, in the fusing drive of the initial operation, increases a rate of increase of the value of the current supplied to the at least one electrode during the launching operation period, in accordance with the degree of erosion determined by the evaluating portion. In this case, in the launching operation, it is possible to deal with a tendency for concavities and convexities formed on the leading extremity side of the electrode to become difficult to melt along with a temporal aging.

According to still another aspect of the invention, the drive, in the fusing drive of the initial operation, increases the value of the current supplied to the at least one electrode at an end of the launching operation provided after a start of the initial operation. In this case, the temperature of the at least one electrode increases sharply at a final stage of the launching operation, and it is possible to increase the volume of the fused portion of the leading extremity side of the at least one electrode.

According to still another aspect of the invention, the drive, in the fusing drive of the initial operation, in the event that a voltage between the first electrode and the second electrode reaches a predetermined voltage value, temporarily increases the value of the current supplied to the at least one electrode compared with that before reaching the predetermined voltage value. By this means, it being possible to further increase the temperature in a condition in which the electrode is sufficiently preheated, it is possible to reliably increase the volume of the fused portion.

According to still another aspect of the invention, the light source apparatus further including an evaluating portion that determines the degree of erosion of the arc tube, the drive, in the fusing drive of the initial operation, increases the value of the current supplied to the at least one electrode at the end of the launching operation period, in accordance with the degree of erosion determined by the evaluating portion. In this case, in the launching operation, it is possible to deal with the tendency for the concavities and convexities formed on the leading extremity side of the electrode to become difficult to melt along with the temporal aging.

According to still another aspect of the invention, the drive, in the fusing drive of the initial operation, makes an anode duty ratio relating to a current to one electrode, of the first electrode and second electrode, greater than at the time of the rated drive at the time of the steady operation. In this case, it being possible to relatively increase the energy supplied to the relevant one electrode, it is possible to reliably increase the fusion volume.

According to still another aspect of the invention, the light source apparatus further including an evaluating portion that determines the degree of erosion of the arc tube, the drive, in the fusing drive of the initial operation, increases the anode duty ratio relating to the relevant one electrode in accordance with the degree of erosion determined by the evaluating portion. In this case, in the launching operation, it is possible to deal with the tendency for the concavities and convexities formed on the leading extremity side of the electrode to become difficult to melt along with the temporal aging.

According to still another aspect of the invention, the drive, in the fusing drive of the initial operation, superimposes a direct current, of a polarity the same as an anode of the relevant one electrode, on the alternating current supplied to the first electrode and the second electrode. In this case, as a direct current of a polarity the same as the anode of the relevant one electrode is superimposed on the alternating current, it being possible to relatively increase the energy supplied to the relevant one electrode, it is possible to reliably increase the fusion volume.

According to still another aspect of the invention, the light source apparatus further including an evaluating portion that determines a condition of the arc tube, the drive, in the fusing drive of the initial operation, increases the direct current to be superimposed on the alternating current supplied to the first electrode and the second electrode in accordance with the degree of erosion determined by the evaluating portion. In this case, in the launching operation, it is possible to deal with the tendency for the concavities and convexities formed on the leading extremity side of the electrode to become difficult to melt along with the temporal aging.

According to still another aspect of the invention, the drive, at the time of the fusing drive of the initial operation, making a current waveform supplied to at least one electrode a superimposed wave, wherein a triangular waveform is superimposed on a rectangular wave and a current gradually increases over a half cycle, a proportion of a maximum current value of the current waveform, with respect to an average current value in the anode period of the at least one electrode, at the time of the fusing drive is greater than a proportion of a maximum current value with respect to an average current value in the anode period of the at least one electrode in the rated drive of the steady operation. In this case, it being possible to relatively increase the temperature of one electrode, it is possible to increase the fusion volume.

According to still another aspect of the invention, the light source apparatus further including an evaluating portion that determines the condition of the arc tube, the drive, at the time of the fusing drive of the initial operation, increases the proportion of the maximum current value of the current waveform with respect to the average current value in the anode period of at least one electrode, at the time of the fusing drive, in accordance with a degree of erosion determined by the evaluating portion. In this case, in the launching operation, it is possible to deal with the tendency for the concavities and convexities formed on the leading extremity side of the electrode to become difficult to melt along with the temporal aging.

According to still another aspect of the invention, the drive, as an aspect of the fusing drive of the initial operation, can carry out, for one fusing drive, either one of a first fusing drive, which melts the leading extremity side of the first electrode more than the leading extremity side of the second electrode, or a second fusing drive, which melts the leading extremity side of the second electrode more than the leading extremity side of the first electrode. Also, the drive, by carrying out the second fusing drive as a fusing drive of a current initial operation in the event that the first fusing drive has been carried out as a fusing drive of an immediately preceding initial operation, and carrying out the first fusing drive as the fusing drive of the current initial operation in the event that the second fusing drive has been carried out as the fusing drive of the immediately preceding initial operation, alternately makes the first electrode and the second electrode a main fusion subject. In this case, it being possible to fuse the leading extremity side of the first electrode and the leading extremity side of the second electrode in a balanced manner, it is possible to avoid a smoothing out, a restoration or a reproduction being executed unevenly.

A drive method of the light source apparatus according to an aspect of the invention carries out the steady operation supplying the steady energy to the first electrode and the second electrode of the discharge light emitting type arc tube and, before carrying out the steady operation, carries out the initial operation supplying energy to the first electrode and the second electrode, with an operation differing from the steady operation. The method includes carrying out the fusing drive making the volume of the fused portion of the leading extremity side of at least one electrode, of the first electrode and the second electrode, in the initial operation greater than the volume of the fused portion of the leading extremity side of the at least one electrode at the time of the rated drive during the steady operation.

With the heretofore described drive method, as the volume of the fusion portion of the leading extremity side of at least one electrode, at any time during the initial operation, is made greater than the volume of the fusion portion of the leading extremity side of the at least one electrode at the time of the rated drive during the steady operation, a repair or a restoration of the electrode utilizing the lighting start period becomes possible. Therefore, as well as being possible to maintain the illuminance of the illumination light from the light source apparatus, it is possible to lengthen a life span of the light source apparatus and, by extension, the projector. At this time, as the fusion volume of the electrode is increased without interrupting the steady operation, it is possible to prevent a brightness of a source light or projection image from fluctuating after an actual start of use.

The increase of the volume of the fused portion is a phenomenon which occurs inside the arc tube. For this reason, it is not necessarily easy to ascertain whether or not the volume of the fused portion is being increased. However, it is possible to ascertain the invention as the following aspects of the light source apparatus. Also, the invention can be realized in aspects, not only as the light source apparatus, but also as a drive method of the light source apparatus.

It is also acceptable that the light source apparatus according to some aspects of the invention includes an arc tube having a first electrode and a second electrode that carry out an emission of light due to a discharge between them, and a drive that, when supplying energy in an alternating current to the first electrode and the second electrode, carries out a steady operation supplying a steady energy to the first electrode and the second electrode, and an initial operation making a cumulative energy supplied to at least one electrode, of the first electrode and the second electrode, in an anode period of the relevant electrode, prior to the steady period, greater than during the steady period. In this way, by making the cumulative energy supplied in the anode period of the at least one electrode greater than at the time of rated drive, it is possible to increase the temperature of the leading extremity of the relevant electrode at the time of the initial drive. For this reason, melting and smoothing out the surface of the protruding leading extremity formed on the leading extremity side of the electrode, and the leading extremity side area on the periphery thereof, utilizing the lighting start period, it is possible to suppress an occurrence of a flicker and an arc jump.

Also, it is also acceptable that the light source apparatus according to some aspects of the invention includes an arc tube having a first electrode and a second electrode that carry out an emission of light due to a discharge between them, and a drive that, when supplying energy in an alternating current to the first electrode and the second electrode, carries out a steady operation supplying a steady energy to the first electrode and the second electrode, and an initial operation making a cumulative energy supplied to at least one electrode, of the first electrode and the second electrode, in a latter half of an anode period of the relevant electrode, prior to the steady period, greater than during the steady period. In this way, by making the cumulative energy supplied to the at least one electrode in the latter half of the anode period of the relevant electrode greater than at the time of the rated drive, it is possible to increase the temperature of the leading extremity of the relevant electrode at the time of the initial drive. For this reason, melting and smoothing out the surface of the protruding leading extremity formed on the leading extremity side of the electrode, and the leading extremity side area on the periphery thereof, utilizing the lighting start period, it is possible to suppress an occurrence of a flicker and an arc jump.

Furthermore, it is also acceptable that the light source apparatus according to some aspects of the invention includes an arc tube having a first electrode and a second electrode that carry out an emission of light due to a discharge between them, and a drive that, when supplying an alternating current to the first electrode and the second electrode, carries out a steady operation supplying a steady current to the first electrode and the second electrode, and an initial operation making a maximum value of a current supplied in an anode period of at least one electrode, of the first electrode and the second electrode, prior to the steady period, greater than during the steady period. In this way, by increasing the maximum value of the current supplied in the anode period of the at least one electrode, it is possible to increase the temperature of the leading extremity of the relevant electrode at the time of the initial drive. For this reason, melting and smoothing out the surface of the protruding leading extremity formed on the leading extremity side of the electrode, and the leading extremity side area on the periphery thereof, utilizing the lighting start period, it is possible to suppress an occurrence of a flicker and an arc jump.

A projector according to an aspect of the invention includes (a) the heretofore described light source apparatus, (b) a light modulating device illuminated by an illumination light from the light source apparatus, and (c) a projection optical system that projects an image formed by the light modulating device.

With the heretofore described projector, as the heretofore described light source apparatus is used, a repair or restoration of an electrode utilizing the lighting start period is possible.

BRIEF DESCRIPTION OF THE DRAWINGS

The invention will be described with reference to the accompanying drawings, wherein like numbers reference like elements.

FIG. 13A is a diagram schematizing a leading extremity side of an electrode, and illustrating a flow of heat, while

DETAILED DESCRIPTION OF EMBODIMENTS

Figure 1:
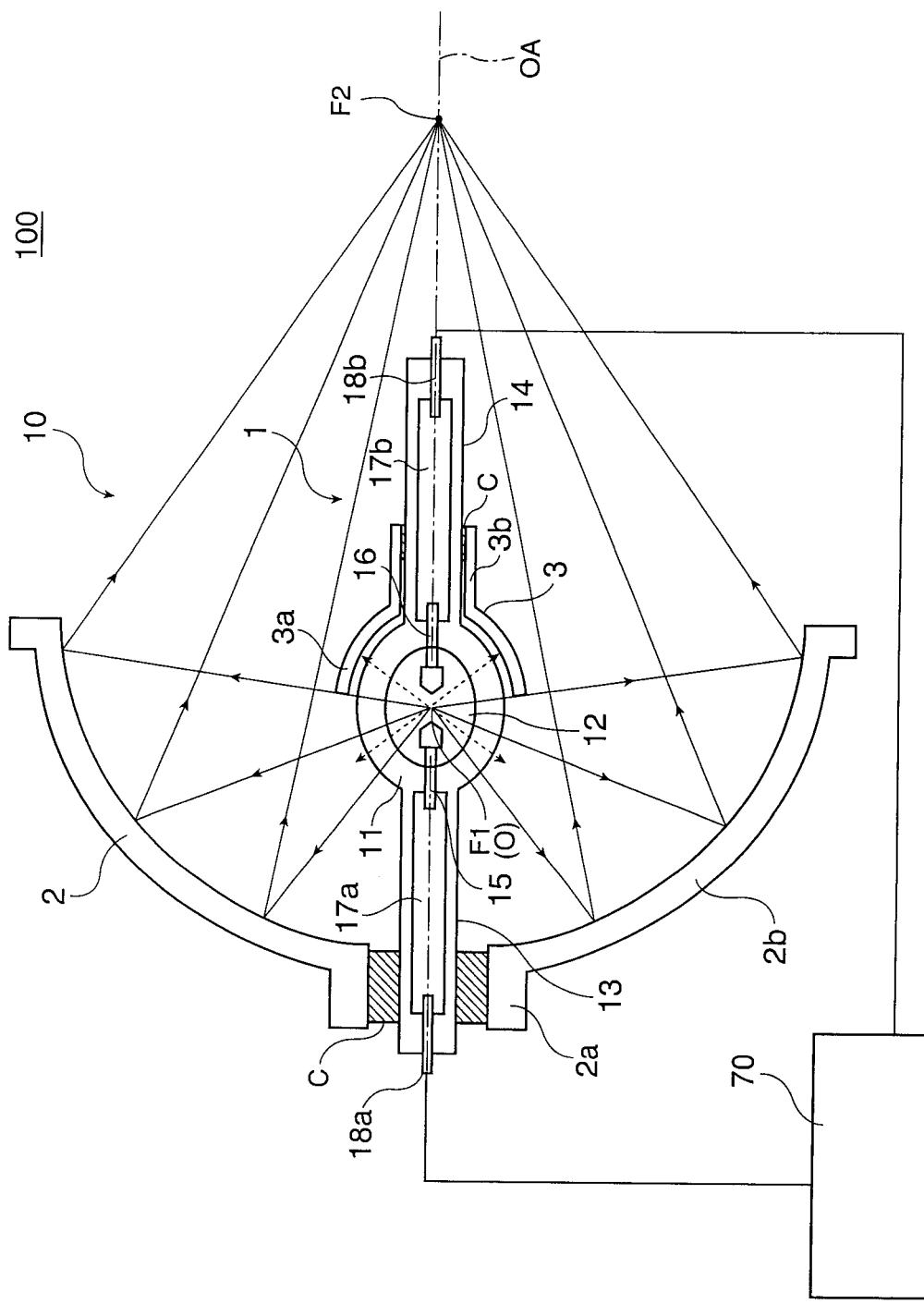
FIG. 1 is a sectional view illustrating a light source apparatus of one embodiment of the invention.

Hereafter, with reference to the drawings, a description will be given of a structure, operations and the like of a light source apparatus, which is one embodiment of the invention.
Light Source Apparatus Structure and Operations FIG. 1 is a sectional view conceptually illustrating a structure of a light source apparatus 100. In the light source apparatus 100, a light source unit 10, which is a discharge lamp, includes a discharge light emitting type arc tube 1, a reflector 2, which is an elliptical main reflecting mirror, and a secondary mirror 3, which is a spherical secondary reflecting mirror. Also, although a detailed description will be given hereafter, a light source drive device 70 is an electrical circuit for supplying an alternating current to the light source unit 10, and causing it to emit a light in a desired condition.

In the light source unit 10, the arc tube 1, being configured of a spherically bulging translucent quartz glass tube, a central portion of which bulges in a spherical form, includes a main body portion 11, which is an enclosed body emitting a light for illumination, and first and second sealing portions 13 and 14, which extend along an axis line passing through both extremities of the main body portion 11.

In a discharge space 12 formed inside the main body portion 11, a leading extremity portion of a tungsten first electrode 15 and, in the same way, a leading extremity portion of a tungsten second electrode 16, being disposed separated by a predetermined distance, a gas, which is a discharge medium including a noble gas, a metal halogen compound and the like, is enclosed. Molybdenum metal foils 17a and 17b, electrically connected to a base portion of the first and second electrodes 15 and 16 provided in the main body portion 11, being inserted into an interior of each of the sealing portions 13 and 14 extending one at either extremity of the main body portion 11, both sealing portions 13 and 14 are sealed thereby, or by a glass material or the like, airproofed from an exterior. On supplying an alternating pulse form of power, with the light source drive device 70, to leads 18a and 18b connected to the metal foils 17a and 17b, an arc discharge occurs between the pair of electrodes 15 and 16, and the main body portion 11 emits light at a high luminance.

The secondary mirror 3 is in close proximity to and covers, of the main body portion 11 of the arc tube 1, approximately a half of a luminous flux projection forward side, where the second electrode 16 is. The secondary mirror 3, being an integrated molded article of quartz glass, includes a secondary reflecting portion 3a, which returns a luminous flux radiated forward from the main body portion 11 of the arc tube 1 to the main body portion 11, and a supporting portion 3b, which is fixed to a perimeter of the second sealing portion 14 in a condition in which it supports a base portion of the secondary reflecting portion 3a. The supporting portion 3b, as well as allowing the second sealing portion 14 to be inserted through, holds the secondary reflecting portion 3a in a condition in which it is aligned with the main body portion 11. The secondary mirror 3 can be omitted in an application in which a light use efficiency is not considered to be much of a problem.

The reflector 2 is disposed opposed to, of the main body portion 11 of the arc tube 1, approximately a half of a luminous flux projection rear side, where the first electrode 15 is. The reflector 2, being an integrated molded article of crystallized glass or quartz glass, includes a neck-shaped portion 2a, through which the first sealing portion 13 of the arc tube 1 is inserted, and an elliptically curved main reflecting portion 2b spreading out from the neck-shaped portion 2a. The neck-shaped portion 2a, as well as allowing the first sealing portion 13 to be inserted through, holds the main reflecting portion 2b in a condition in which it is aligned with the main body portion 11.

The arc tube 1, as well as being disposed along a system optical axis OA corresponding to a main reflecting portion 2b rotational symmetry axis or optical axis, is disposed in such a way that an emission center O of the first and second electrodes 15 and 16 inside the main body portion 11 corresponds to a first focal point F1 position on an elliptical surface of the main reflecting portion 2b. When lighting the arc tube 1, luminous fluxes radiated from an arc in a periphery of the emission center O of the main body portion 11 are reflected by the main reflecting portion 2b, or are further reflected by the main reflecting portion 2b after a reflection by the secondary reflecting portion 3a, and become luminous fluxes converged at a second focal point F2 position on the elliptical surface. That is, the reflector 2 and the secondary mirror 3 having reflecting surfaces which are approximately axisymmetric with respect to the system optical axis OA, the pair of electrodes 15 and 16 are disposed in such a way that an electrode axis, which is an axial center thereof, is caused to approximately correspond to the system optical axis OA.

The arc tube 1 is made by means of a shrink sealing which, holding the first and second electrodes 15 and 16 fixed to a leading extremity of the metal foils 17a and 17b in, for example, the quartz glass tube, and heating the quartz glass tube from a perimeter, with a burner, in portions corresponding to both sealing portions 13 and 14, causes a softening and a contraction. The arc tube 1, in a condition in which the first sealing portion 13 is inserted in the neck-shaped portion 2a of the reflector 2, is fixed by injecting and filling with an inorganic adhesive C, and allowing it to solidify, and the secondary mirror 3, in a condition in which the second sealing portion 14 of the arc tube 1 is inserted through the supporting portion 3b, is fixed by injecting and filling with the inorganic adhesive C, and allowing it to solidify.

Figure 2:
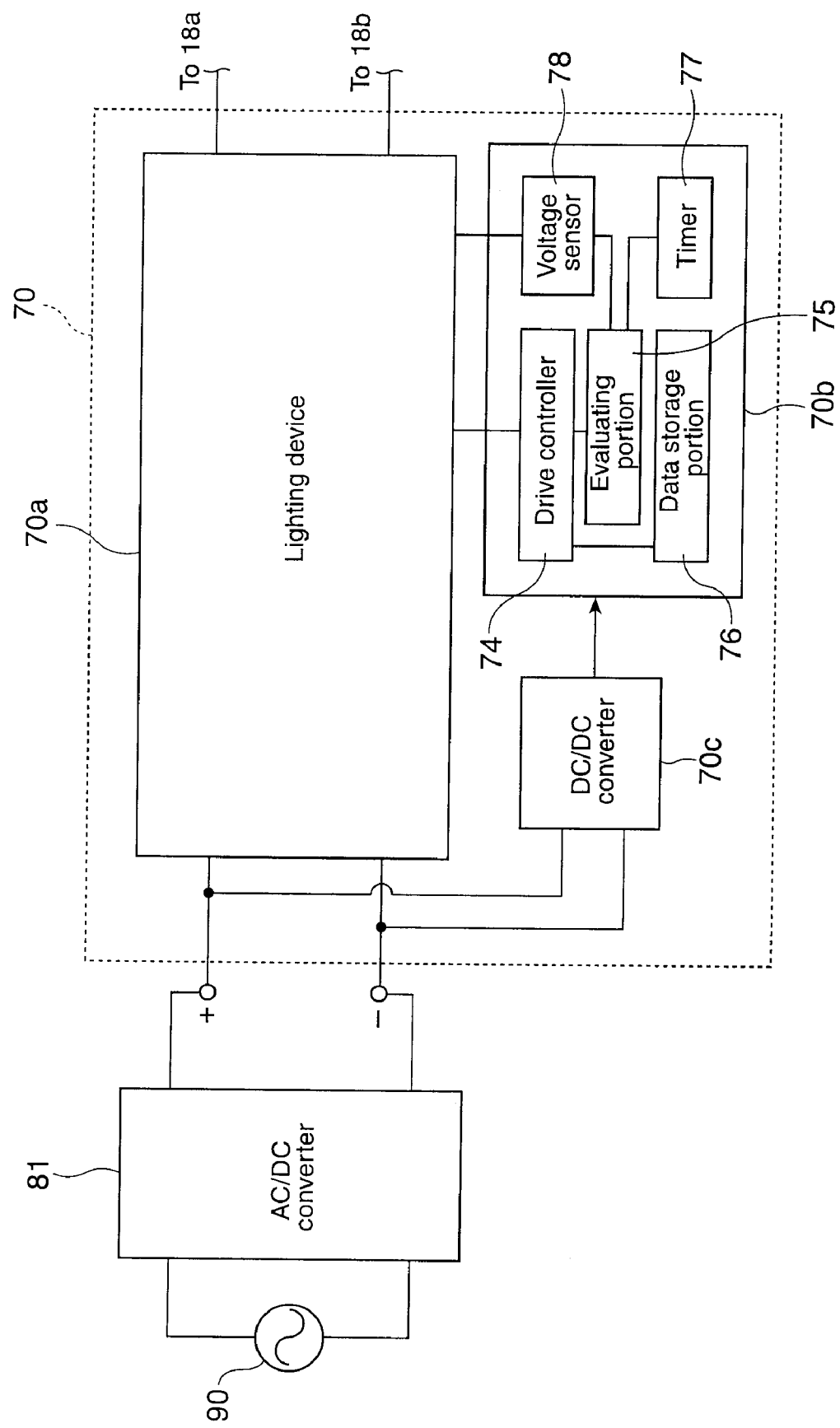
FIG. 2 is a block diagram showing a configuration of a current drive device embedded in the light source apparatus.

FIG. 2 is a block diagram schematically showing a configuration of the light source drive device 70 for causing the light source unit 10 shown in FIG. 1 to operate illuminated in a desired condition.

The light source drive device 70, as well as generating an alternating current for carrying out a discharge between the pair of electrodes 15 and 16 shown in FIG. 1 etc., controls a condition of a supply of the alternating current to both the electrodes 15 and 16. The light source drive device 70 includes a lighting device 70a, a controller 70b, and a DC/DC converter 70c. Herein, as one example, a description will be given of a case in which the light source drive device 70 uses an external power source. That is, the light source drive device 70 being connected to an AC/DC converter 81, the AC/DC converter 81 is connected to a commercial power source 90. The AC/DC converter 81 converts an alternating current supplied from the commercial power source 90 into a direct current.

The lighting device 70a is a circuit portion which illuminates and drives the light source unit 10 of FIG. 1. A drive waveform output from the light source drive device 70 is adjusted by the lighting device 70a. Herein, the drive waveform having as elements an output current or voltage frequency, an amplitude, a duty ratio, a positive and negative amplitude ratio, a waveform characteristic, and the like, a drive current which has an optional waveform characteristic, such as, for example, a rectangular wave, a triangular wave, or a wave in which they are superimposed, is output from the lighting device 70a to the light source unit 10.

The controller 70b being a circuit unit configured of, for example, a microcomputer, a memory, a sensor, an interface and the like, it is driven by an appropriate drive voltage generated by the DC/DC converter 70c, which is a power source. The controller 70b includes a drive control portion 74, which controls an operational condition of the lighting device 70a, an evaluating portion 75, which evaluates a condition of the arc tube 1, and a data storage portion 76, which stores various kinds of information such as an operational aspect of the lighting device 70a, that is, a power supply condition. Also, the controller 70b includes a timer 77, for measuring a cumulative lit time of the arc tube 1, and a voltage sensor 78, which detects a voltage applied to the arc tube 1.

The drive control portion 74 is a portion which operates in accordance with a program stored in the data storage portion 76 or the like. The drive control portion 74, in a regular operation, as well as selecting, from initial operation power supply conditions and steady operation power supply conditions stored in the data storage portion 76, one appropriate to a current condition of the arc tube 1, causes the lighting device 70a to carry out an initial operation or a steady operation in accordance with the selected power supply condition. The drive control portion 74, in conjunction with the lighting device 70a, functions as a drive portion for supplying power to the arc tube 1, and causing it to carry out a necessary lighting operation. In the embodiment, an operation supplying a steady energy to the first electrode 15 and the second electrode 16 is taken to be the steady operation, and an operation supplying energy to the first electrode 15 and the second electrode 16 before carrying out the steady operation, in an operation differing from the steady operation, is taken to be the initial operation.

The evaluating portion 75 is a portion which evaluates what level the cumulative lit time of the arc tube 1 is at, and what level the voltage applied to the arc tube 1 is at. Specifically, it evaluates what stage of arc tube 1 aging stages the cumulative lit time of the arc tube 1 corresponds to, and what stage of the arc tube 1 aging stages the voltage applied to the arc tube 1 corresponds to.

The data storage portion 76, apart from the operational program of the drive control portion 74, and the like, stores a plurality of initial power supply conditions as aspects of the initial operation of the arc tube 1, and stores a plurality of steady power supply conditions as aspects of the steady operation of the arc tube 1. Two or more initial drive power supply conditions being included in the former initial power supply conditions, one or more steady drive power supply conditions are included in the latter steady power supply conditions. Specifically, the data storage portion 76 stores various kinds of parameter, such as a current value at a starting time or launching time included in the initial operation, a setting value of a frequency and the like, an increase rate, an increase timing, an anode duty ratio, a direct current superposition amount, and various kinds of waveform to be superimposed on the rectangular wave. Also, the data storage portion 76 stores a current value, a frequency, a triangular wave jump rate, and the like, of the steady operation at a rated drive. Herein, the triangular wave jump rate indicates a proportion of a maximum current value with respect to an average current value, in a half cycle of the superimposed wave in which the triangular wave is superimposed on the rectangular wave.

The timer 77, checking the lit time of the arc tube 1, holds the cumulative lit time, which is an accumulation of a lit time for every occasion. The voltage sensor 78 detects and holds the voltage applied to the first and second electrodes 15 and 16 of the arc tube 1 via the lighting device 70a.

Figure 3:
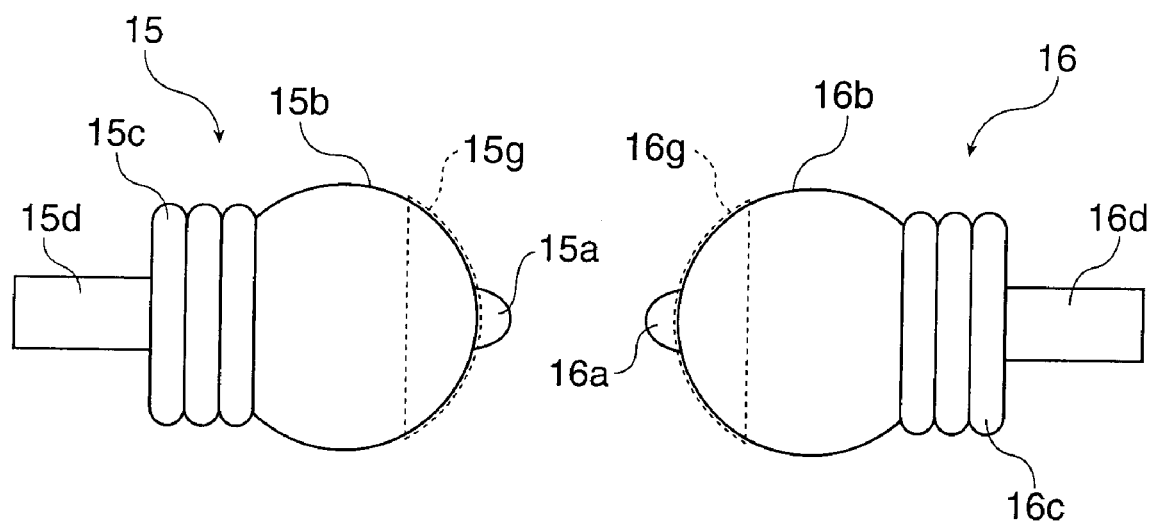
FIG. 3 is an enlarged view illustrating leading extremity peripheral portions of a pair of electrodes.

FIG. 3 is an enlarged view of the leading extremity portions of the first and second electrodes 15 and 16 enclosed inside the arc tube 1. The first and second electrodes 15 and 16 respectively include leading extremities 15a and 16a, main bodies 15b and 16b, coils 15c and 16c, and core rods 15d and 16d. By providing the glob shaped main bodies 15b and 16b at leading extremity sides of the first and second electrodes 15 and 16, it is possible to increase a heat capacity. The leading extremity portions of the first and second electrodes 15 and 16 are formed at, for example, a stage before enclosing, by wrapping tungsten around the core rods 15d and 16d, and heating and fusing them. At this time, a remaining portion of the wrapped tungsten, which has not been fused, becomes the coil rods 15c and 16c.

Figure 4A:
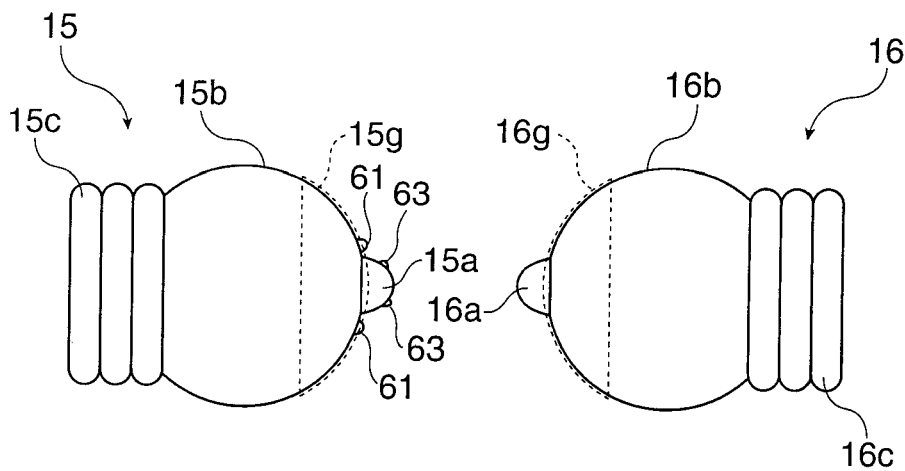
FIGS. 4A to 4C are enlarged views illustrating a repair of an electrode with a light source drive device.
Figure 4B:
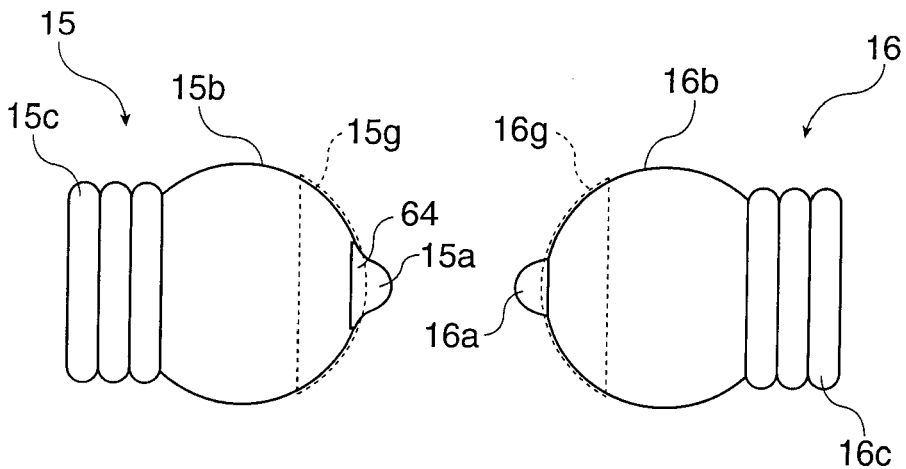
Figure 4C:
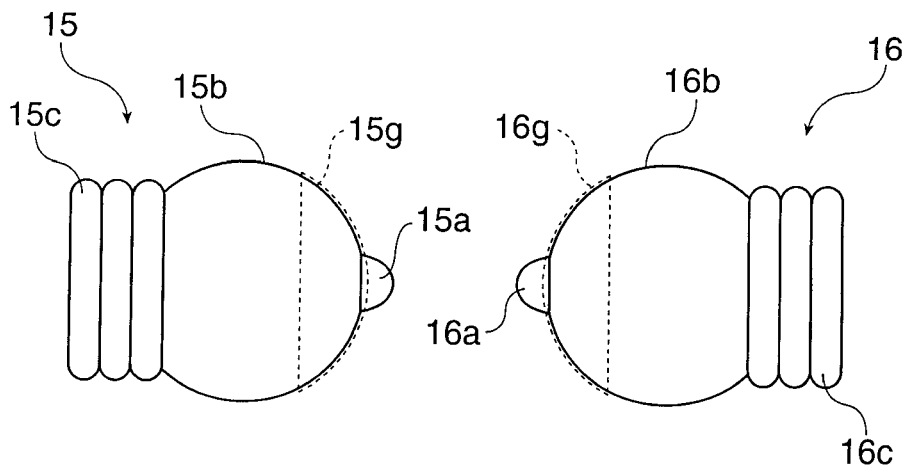

FIGS. 4A to 4C are conceptual diagrams illustrating an action on the first electrode 15 at a time of a fusing drive on, of the two electrodes 15 and 16, the first electrode 15.

In the case of the first electrode 15 shown in FIG. 4A, a plurality of concavities and convexities 61 occur irregularly in a leading extremity side area 15g on a perimeter of the leading extremity 15a. Also, a plurality of microscopic concavities and convexities 63 also occur, along with a continued use, on a surface of the leading extremity 15a. In this case, a phenomenon of a discharge origin moving between the leading extremity 15a and the concavities and convexities 61 and 63, that is, a flicker or arc jump, occurs. Herein, the flicker refers to the movement of the discharge origin occurring continuously, while the arc jump refers to the discharge origin moving completely from an original discharge origin position. The flicker and the arc jump cause a flickering screen or an illuminance reduction. When carrying out the fusing drive on at least the first electrode 15 at the launching time, during the initial operation of the arc tube 1, surfaces of these kinds of concavities and convexities 61 and 63 are melted by raising a temperature of the leading extremity side of the first electrode 15, and a fused portion 64 is formed, as shown in FIG. 4B. That is, by a fusing drive appropriate to the current condition of the arc tube 1 being selected, and an energizing operation being carried out, at the launching time by the light source drive device 70, the temperature of the leading extremity 15a and the like rises. The fusing drive carried out here being a comparatively low level fusing drive, it is possible to secure an appropriate temperature rise of the leading extremity 15a and the leading extremity side area 15g. By this means, it being possible to form the fused portion 64 with the leading extremity 15a left almost intact, it is possible to smooth out the concavities and convexities 61 and 63. At this time, a volume of the fused portion 64 of the leading extremity side of the first electrode 15 is larger than a volume of a fused portion of the leading extremity side of the first electrode 15 at a time of the rated drive during the steady operation, to be described hereafter. Although details will be omitted, a surface of the leading extremity 16a of the second electrode 16 opposing the first electrode 15 is also fused but, in this case, an energizing operation of a regular initial drive being carried out on the second electrode 16 without a fusing drive being carried out, the volume of the fused portion is small, and of an extent that a shape does not change. As the heretofore described fusing drive is carried out during the initial operation, it does not have a large effect on a performance as a video instrument.

After the operation according to the heretofore described kind of fusing drive, the initial operation is finished, and a shift is made to the steady operation. In the steady operation, the rated drive is carried out and, as shown in FIG. 4C, the shape of the electrode leading extremity 15a is maintained.

The description given heretofore has been of the first electrode 15 but, with regard to the second electrode 16 too, as the same kinds of concavities and convexities 61 and 63 are formed with time, it is possible to smooth out the concavities and convexities 61 and 63 by causing an energizing operation with the same kind of fusing drive as that heretofore described.

Also, in the event that an energizing time of the first and second electrodes 15 and 16 becomes long, despite the two electrodes 15 and 16 wearing away and the smoothing out of the concavities and convexities 61 and 63 becoming necessary, the concavities and convexities 61 and 63 gradually become difficult to fuse. Therein, with an operation of the light source drive device 70, an amount of a temperature rise of the leading extremity sides of the first and second electrodes 15 and 16 at the launching time, during the initial operation of the arc tube 1, is, for example, gradually increased along with an increase in the cumulative lit time. By this means, as it is possible to secure a fused amount of the concavities and convexities 61 and 63 even when the lit time becomes long, it is possible to prevent any impediment to maintaining the shapes of the leading extremities 15a and 16a. Herein, as a method of increasing the amount of the temperature rise of the leading extremity sides of the electrodes 15 and 16, for example, (1) an increase of an increase rate of a current supplied to the two electrodes 15 and 16 in at least, during the initial operation, a launching period including a period immediately before switching to the steady operation, (2) an increase of a current setting value at a termination of the launching period provided after a commencement of the initial operation, (3) an increase of the anode duty ratio relating to a subject electrode, of the two electrodes 15 and 16, at the time of the initial operation, (4) an increase of the direct current superposition amount with respect to an alternating current at the time of the initial operation, (5) an adjustment of a superposition proportion of each kind of waveform to be superimposed on the rectangular wave at the time of the initial operation, (6) a reduction of the frequency of the current supplied to the two electrodes 15 and 16 at the time of the initial operation, and the like, can be considered. The heretofore described methods (1) to (6) are enabled by making a cumulative energy supplied in an anode period of each electrode 15 and 16 at the time of the fusing drive of the initial operation greater than a cumulative energy supplied in an anode period of the corresponding electrodes 15 and 16 at the time of the rated drive during the steady operation. Also, the heretofore described methods (1) to (6) are enabled by making a cumulative energy supplied in a latter half of the anode period of each electrode 15 and 16 at the time of the fusing drive of the initial operation greater than a cumulative energy supplied in a latter half of the anode period of the corresponding electrodes 15 and 16 in the rated drive of the steady operation. Also, the heretofore described methods (1) to (6) are enabled by making a maximum value of a current supplied in the anode period of each electrode 15 and 16 at the time of the fusing drive of the initial operation greater than a maximum value of a current supplied in the anode period of the corresponding electrodes 15 and 16 in the rated drive of the steady operation.

Figure 5A:
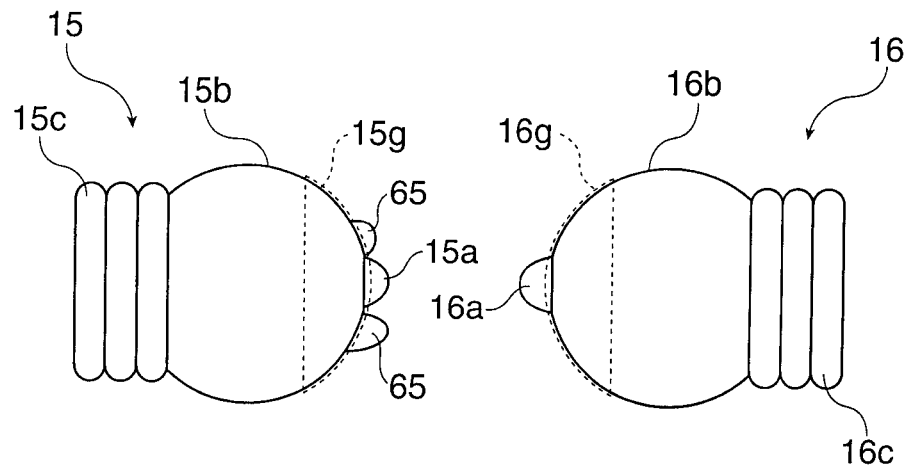
FIGS. 5A to 5C are enlarged views illustrating a restoration of an electrode with the light source drive device.
Figure 5B:
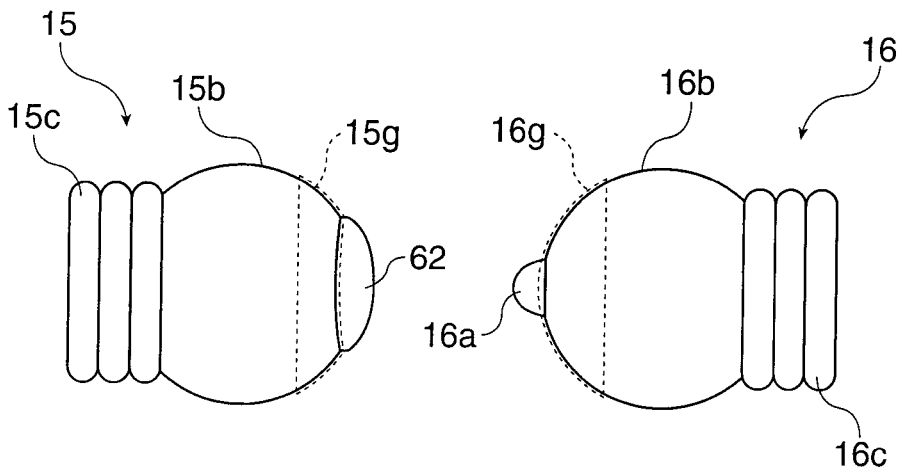
Figure 5C:
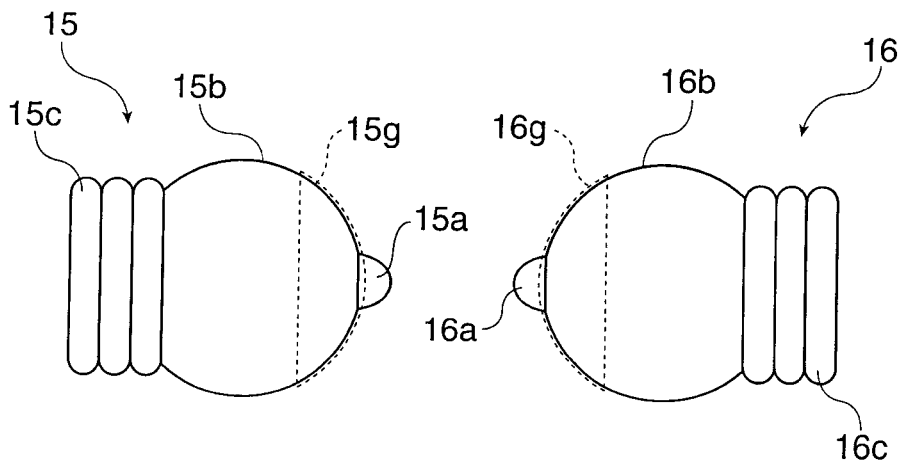

FIGS. 5A to 5C are conceptual diagrams illustrating a restorative operation on, of the two electrodes 15 and 16, the first electrode 15.

In the case of the first electrode 15 shown in FIG. 5A, the cumulative lit time has increased, the aging has progressed, and it is in a serious aging condition wherein restoration is necessary. Specifically, in the leading extremity side area 15g of the main body 15b, a condition is such that a plurality of concavities and convexities 65, of a size comparable with the leading extremity 15a, have appeared irregularly. In this case too, the phenomenon of the discharge origin moving between the leading extremity 15a and the concavities and convexities 65, that is, the arc jump or the flicker, occurs. In the case of reaching the condition in which the aging of the first electrode 15 has progressed in this way, by selecting and executing a fusing drive shown in FIG. 5B and a reproduction drive shown in FIG. 5C, it is possible to return the first electrode 15 to a condition close to the condition before the aging.

Specifically, as shown in FIG. 5B, by the energizing operation being carried out with the fusing drive, by the light source drive device 70, at the time of the initial operation, the temperature of the leading extremity 15a and the like of the first electrode 15 rises. That is, the first electrode 15 on which have occurred the concavities and convexities 65, which cause the flicker and arc jump, is heated as far as or higher than the case of the regular initial drive or the comparatively low level fusing drive shown in FIG. 4B. The fusing drive carried out here being a comparatively high level fusing drive corresponding to a special operation, it can melt and smooth out the concavities and convexities 65 and the leading extremity 15a of the first electrode 15, forming a fused portion 62 which spreads out flat. As the heretofore described fusing drive is carried out during the initial operation, it does not have a large effect on the performance as a video instrument. In the case of carrying out the comparatively high level fusing drive in the initial operation, the reproduction drive which causes the leading extremity 15a to grow is carried out in the steady operation. With the reproduction drive of the steady operation, as shown in FIG. 5C, it is possible to cause a well-shaped leading extremity 15a to grow from a center of the flat fused portion 62 of FIG. 5B by an adjustment of the drive waveform supplied to the arc tube 1. That is, at the time of the steady operation, rather than the rated drive corresponding to the regular operation, the reproduction drive corresponding to the special operation is selected and carried out by the light source drive device 70. With the reproduction drive, it is possible to cause a regrowth of a leading extremity 15a which has a comparatively good shape and is of a sufficient size. The heretofore described reproduction drive being a process which causes the leading extremity 15a to grow large, as it can be presumed that a luminance of the light source unit 10 gradually increases, and a brightness of a projection image increases, along with a gradual decrease of an arc length, there is little likelihood of a user noticing a progression of the restorative operation, and it is possible to prevent an aging of a display performance from a visual aspect wherein a display operation of a video instrument fluctuates violently along with the restoration.

The description given heretofore has been of the first electrode 15 but, with regard to the second electrode 16 too, as the same kinds of concavities and convexities 65 are formed with time, it is possible to, as well as melting and smoothing out the concavities and convexities 65 and a leading extremity 16a by causing an energizing operation with the same kind of comparatively high level fusing drive corresponding to a special operation as that heretofore described, cause a regrowth of the leading extremity 16a which has a comparatively good shape and is of a sufficient size by causing an energizing operation in the steady operation with the same kind of special operation reproduction drive as that heretofore described.

Also, in the event that the energizing time of the first and second electrodes 15 and 16 becomes long, despite the two electrodes 15 and 16 wearing away and the smoothing out of the concavities and convexities 65 becoming necessary, the concavities and convexities 65 formed on the leading extremities 15a and 16a gradually become difficult to fuse. Therein, with an operation of the light source drive device 70, the amount of the temperature rise of the leading extremity sides of the first and second electrodes 15 and 16 in the initial operation of the arc tube 1, is, for example, gradually increased along with the increase in the cumulative lit time. By this means, as it is possible to secure a fused amount of the concavities and convexities 65 even when the lit time of the arc tube 1 becomes long, it is possible to prevent any impediment to a good growth of the leading extremities 15a and 16a. Herein, as a method of increasing the amount of the temperature rise of the leading extremity sides of the electrodes 15 and 16, for example, (1) an increase of the increase rate of the current supplied to the two electrodes 15 and 16 in at least, during the initial operation, the launching period including the period immediately before switching to the steady operation, (2) an increase of the current setting value at the termination of the launching period provided after the commencement of the initial operation, (3) an increase of the anode duty ratio relating to the subject electrode, of the two electrodes 15 and 16, at the time of the initial operation, (4) an increase of the superposition amount of the direct current of the initial operation to the two electrodes 15 and 16, (5) an adjustment of the superposition proportion of each kind of waveform to be superimposed on the rectangular wave of the initial operation, (6) a reduction of the frequency of the current supplied to the two electrodes 15 and 16 at the time of the initial operation, and the like, can be considered. The heretofore described methods are similar to the low level fusing drive shown in FIGS. 4A to 4C but, in order that the volume of the fused portion of the leading extremity side of the electrode due to the high level fusing drive is greater than the volume of the fused portion of the leading extremity side of the electrode due to the low level fusing drive, the energy supplied to the electrodes at the time of the fusing drive is appropriately adjusted.

In the present specification, the cumulative energy being a temporal integration value of an input energy P1 (to be described hereafter) flowing into the electrodes within a predetermined period, it increases along with an increase of the current value or the anode period. Also, as will be described hereafter, the input energy P1 during the anode period is a value in which the drive waveform (the current) is multiplied by a coefficient α, which is an input energy per unitary current. The coefficient α is determined by the condition of the electrodes, a pressure inside the arc tube 1, or the operational condition or the like of the arc tube 1. For this reason, in the embodiment, the cumulative energy is adjusted by adjusting the current value in the anode period, or a length of the anode period.

First Operational Example

Figure 6:
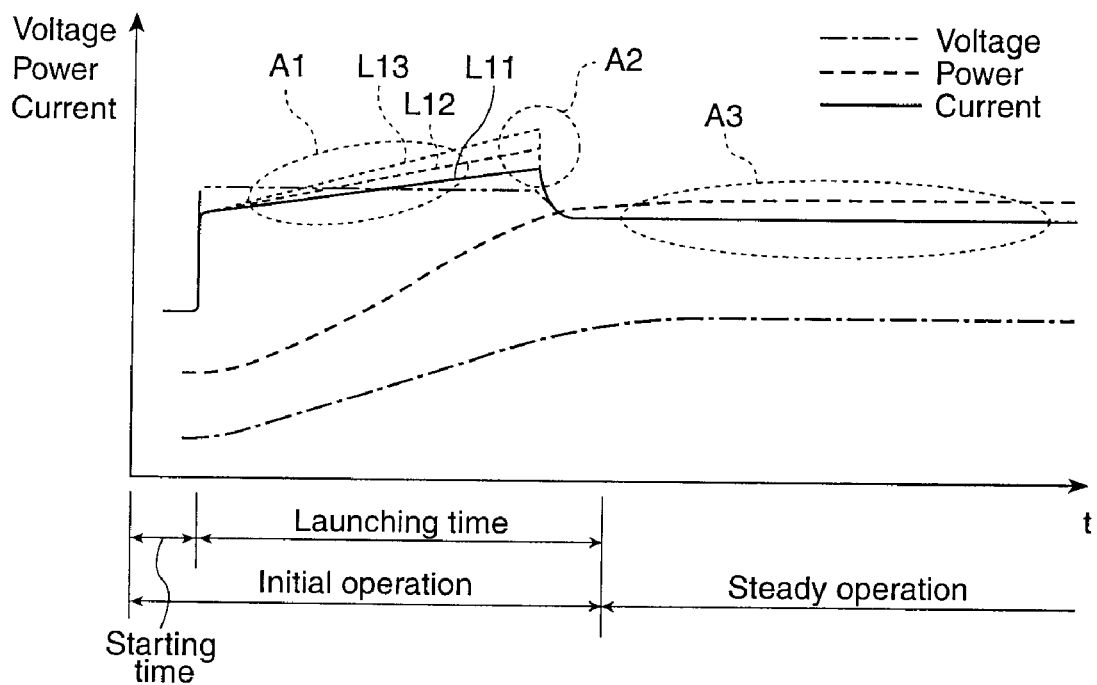
FIG. 6 is a graph conceptually illustrating one example of an energized condition of an arc tube.

Hereafter, a description will be given of a first operational example with the fusing drive of the light source apparatus 100 shown in FIG. 1. FIG. 6 is a graph conceptually illustrating the energizing condition by the light source drive device 70 from the initial operation to the steady operation of the arc tube 1, in the operational example. In the graph, a horizontal axis indicates a time elapsed since a start of lighting, while a vertical axis indicates the voltage (a chain line), the power (a broken line), and the current (a solid line) which are supplied to the arc tube 1. In the graph, the energizing operation of the regular initial drive is indicated in the graph by a two-dot chain line.

In the first operational example, an initial operation period of around sixty-something seconds is provided, after which a steady operation period is provided. The initial operation period being a period for supplying a transient energy (specifically, a transient power) to the arc tube 1, the steady operation period is a period for supplying a steady energy (specifically, a steady power) to the arc tube 1. In this case, with regard to the initial operation period, a starting period of around a few seconds, and a subsequent launching period of around 60 seconds, are provided. Regarding the voltage, it gradually increases during the initial operation period, and saturates at a certain value during the steady operation period. Also, regarding the power, it gradually increases in the launching period during the initial operation period, and during the steady operation period it is normally set by a rated operation by which it is maintained at a constant value. Furthermore, regarding the current, it gradually increases by a certain proportion in the launching period during the initial operation period after a dielectric breakdown (an area A1 in the figure), temporarily decreases at a subsequent starting time of the steady operation (an area A2 in the figure), and is maintained at an approximately constant value during the subsequent steady operation period (an area A3 in the figure).

In this case, by increasing the value of the current supplied to the first and second electrodes 15 and 16 along with the passing of time in the area A1 of at least, during the initial operation, the launching period including the period immediately before switching to the steady operation, the temperature of the first and second electrodes 15 and 16 gradually increases, and it is possible, in a final stage of the launching period, to increase the volume of the fused portions 62 and 64 of the leading extremity sides of the first and second electrodes 15 and 16 in comparison with the time of the rated drive during the steady operation. Also, although an illustration is omitted, in the case of the high level fusing drive shown in FIG. 5B, the fusion volume is increased in comparison with the low level fusing drive shown in FIG. 4B by appropriately making a gradient of the current increase relatively steeper.

Figure 7:
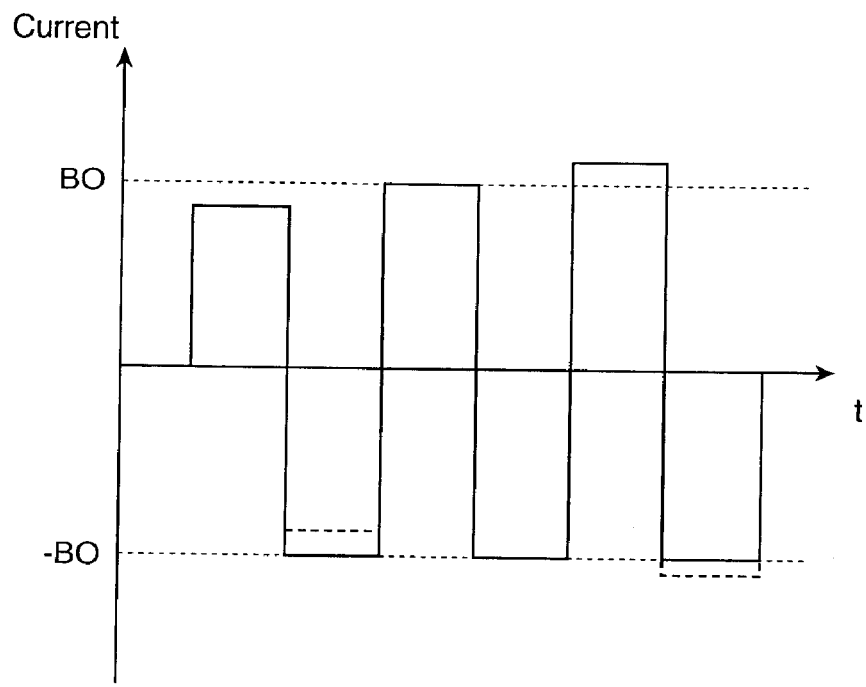
FIG. 7 is a graph illustrating a drive waveform at a launching time.

The description given heretofore has been one in which the volumes of the fused portions 62 and 64 are increased for both the first and second electrodes 15 and 16, but it is possible to increase the volumes of the fused portions 62 and 64 for only either one of the first electrode 15 or the second electrode 16. In this case, as shown in FIG. 7, the alternating current supplied to the arc tube 1, only on, for example, a side on which the first electrode 15 becomes the anode, gradually increases as in any one of L11 to L13 shown in FIG. 6, and is maintained at a value B0 of the regular operation indicated by the two-dot chain line in FIG. 6 on a side on which the second electrode 16 becomes the anode. In the case in which the fusing drive is carried out for only either one of the first electrode 15 or the second electrode 16 in this way, the first electrode 15 and the second electrode 16 are alternately made a main fusion subject by carrying out a fusing drive increasing the volumes of the fused portions 62 and 64 of the leading extremity sides of the second electrode 16 as the fusing drive of the current initial operation, in the event that a fusing drive increasing the volumes of the fused portions 62 and 64 of the leading extremity sides of the first electrode 15 has been carried out in an immediately preceding initial operation, and carrying out a fusing drive increasing the volumes of the fused portions 62 and 64 of the leading extremity sides of the first electrode 15 as the fusing drive of the current initial operation, in the event that a fusing drive increasing the volumes of the fused portions 62 and 64 of the leading extremity sides of the second electrode 16 has been carried out as the fusing drive of the immediately preceding initial operation.

Also, taking into consideration that in the event that the energizing time of the first and second electrodes 15 and 16 becomes long, and the aging of the arc tube 1 progresses, the concavities and convexities 61, 63 and 65 formed on the leading extremities 15a and 16a gradually become difficult to fuse, it is possible to gradually increase the current increase rate along with the increase of the cumulative lit time. As shown in the graph of FIG. 6, in the area A1, as the characteristic L11 of the current to the first and second electrodes 15 and 16 corresponds to the low level fusing drive when the aging of the arc tube 1 is in the initial stage, the current increase rate (the gradient) is at its smallest. Also, as the current characteristic L12 corresponds to the low level fusing drive when the aging of the arc tube 1 has progressed to some degree, the current increase rate (the gradient) has become a little larger and, as the current characteristic L13 corresponds to the low level fusing drive when the aging of the arc tube 1 has further progressed, the current increase rate (the gradient) has become still larger. According to the above, as the operation of the low level fusing drive is set in accordance with the aging stage of the arc tube 1, so that an amount of energy is supplied sufficient to secure the fusion volumes of the leading extremity sides of the electrodes 15 and 16, which have become difficult to fuse due to the aging of the arc tube 1 progressing, an initial operation is carried out which is in accordance with the extent of the aging of the arc tube 1.

Heretofore, to facilitate the description, it has been taken that the regular rated drive is carried out during the steady operation period, that is, in the area A3, but it is possible, when necessary, to carry out the reproduction drive (refer to FIG. 5C) in the area A3.

Second Operational Example

Figure 8:
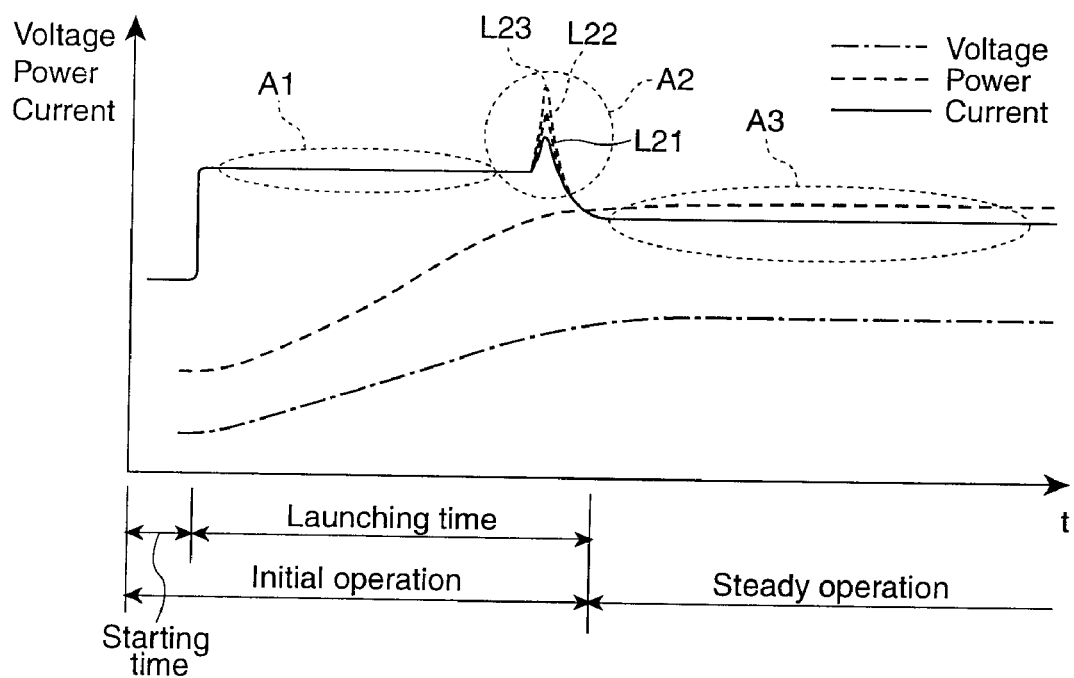
FIG. 8 is a graph conceptually illustrating another example of an energized condition of the arc tube.

Hereafter, a description will be given of a second operational example with the fusing drive. FIG. 8 is a graph conceptually illustrating the energizing condition by the light source drive device 70 from the initial operation to the steady operation of the arc tube 1, in the operational example.

In the second operational example too, the initial operation period of around sixty-something seconds is provided, after which the steady operation period is provided. In this case, the current is maintained at a comparatively large constant value from the commencement to a mid-point during the initial operation period after the dielectric breakdown (an area A1 in the figure), temporarily increases to a peak form at a subsequent termination of the launching time (an area A2 in the figure), and is maintained at an approximately constant value during the subsequent steady operation period (an area A3 in the figure). A timing of increasing the current supplied to the first and second electrodes 15 and 16 can be arranged to be a time at which, for example, the value of the voltage between the first and second electrodes 15 and 16 reaches a predetermined value, but it can also be arranged to be a time at which a predetermined time elapses from the lighting, that is, a starting time of the initial operation.

In this case, in the area A2 of the final stage of the initial operation, which is the termination of the launching operation, as the value of the current supplied to the first and second electrodes 15 and 16 is temporarily sharply increased, the temperature of the first and second electrodes 15 and 16 temporarily increases, and it is possible to increase the volume of the fused portions 62 and 64 of the leading extremity sides of the first and second electrodes 15 and 16 in comparison with the time of the rated drive during the steady operation. Although an illustration is omitted, in the case of the fusing drive shown in FIG. 5B, the fusion volume is increased in comparison with the fusing drive shown in FIG. 4B by appropriately making the amount of the current increase relatively larger.

Figure 9:
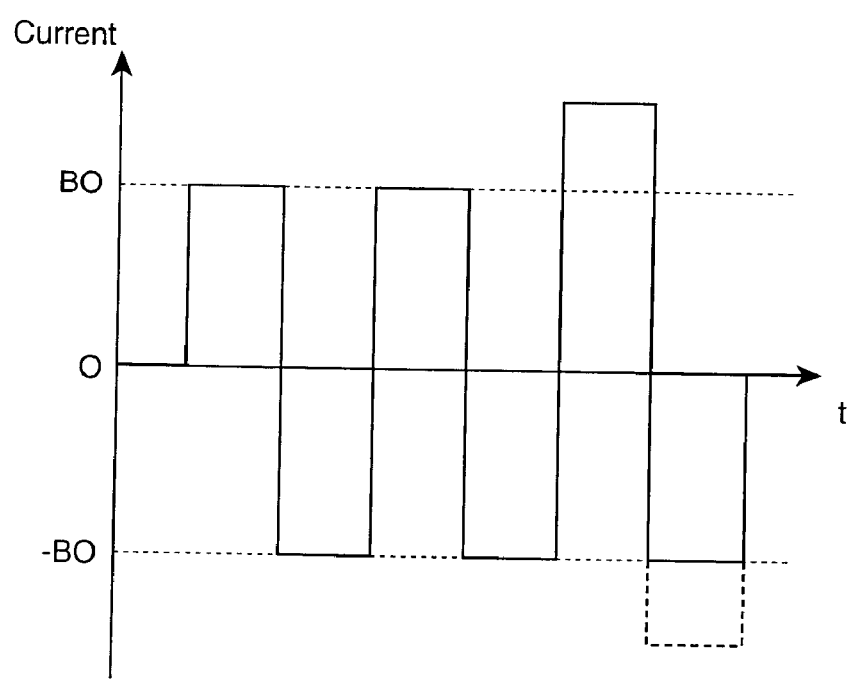
FIG. 9 is a graph illustrating a drive waveform at the launching time.

The description given heretofore has been one in which the volumes of the fused portions 62 and 64 are increased for both the first and second electrodes 15 and 16, but it is possible to increase the volumes of the fused portions 62 and 64 for only either one of the first electrode 15 or the second electrode 16. In this case, as shown in FIG. 9, the alternating current supplied to the arc tube 1, increasing only on, for example, the side on which the first electrode 15 becomes the anode, is maintained at the value B0 of the regular operation on the side on which the second electrode 16 becomes the anode. In the case in which the fusing drive is carried out for only either one of the first electrode 15 or the second electrode 16 in this way, the first electrode 15 and the second electrode 16 are alternately made the main fusion subject by carrying out the fusing drive increasing the volumes of the fused portions 62 and 64 of the leading extremity sides of the second electrode 16 as the fusing drive of the current initial operation, in the event that the fusing drive increasing the volumes of the fused portions 62 and 64 of the leading extremity sides of the first electrode 15 has been carried out in the immediately preceding initial operation, and carrying out the fusing drive increasing the volumes of the fused portions 62 and 64 of the leading extremity sides of the first electrode 15 as the fusing drive of the current initial operation, in the event that the fusing drive increasing the volumes of the fused portions 62 and 64 of the leading extremity sides of the second electrode 16 has been carried out as the fusing drive of the immediately preceding initial operation.

Also, taking into consideration that in the event that the energizing time of the first and second electrodes 15 and 16 becomes long, and the aging of the arc tube 1 progresses, the concavities and convexities 61, 63 and 65 formed on the leading extremities 15a and 16a gradually become difficult to fuse, it is possible to gradually increase a peak value of the current value along with the increase of the cumulative lit time. As shown in the graph of FIG. 8, in the area A2, as a characteristic L21 of the current to the first and second electrodes 15 and 16 corresponds to the low level fusing drive when the aging of the arc tube 1 is in the initial stage, a peak time current value is at its smallest. Also, as a current characteristic L22 corresponds to the low level fusing drive when the aging of the arc tube 1 has progressed to some degree, the peak time current value has become a little larger and, as a current characteristic L23 corresponds to the low level fusing drive when the aging of the arc tube 1 has further progressed, the peak time current value has become still larger. According to the above, as the operation of the low level fusing drive is set in accordance with the aging stage of the arc tube 1, so that the amount of energy is supplied sufficient to secure the fusion volumes of the leading extremity sides of the electrodes 15 and 16, which have become difficult to fuse due to the aging progressing, an initial operation is carried out which is in accordance with the extent of the aging of the arc tube 1.

Heretofore, to facilitate the description, it has been taken that the regular rated drive is carried out during the steady operation period, that is, in the area A3, but it is possible, when necessary, to carry out the reproduction drive in the area A3.

Third Operational Example

Figure 10:
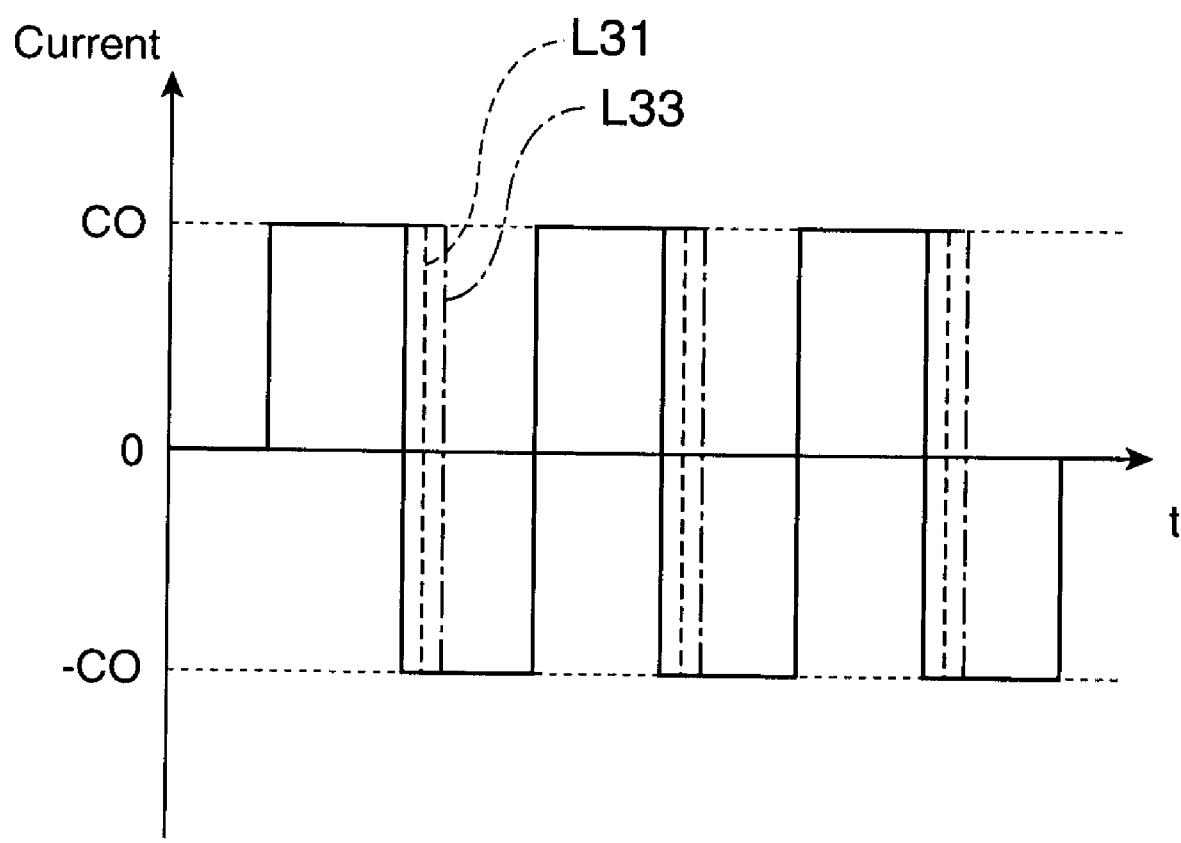
FIG. 10 is a graph illustrating another drive waveform at the launching time.

Hereafter, a description will be given of a third operational example with the fusing drive. FIG. 10 is a graph conceptually illustrating the initial operation of the arc tube 1, in the operational example. In the graph, a horizontal axis indicates the time, while a vertical axis indicates the current value. Also, a solid line indicates the regular initial drive initial operation, while current characteristics L31 and L33 of a dotted line and a chain line indicate the initial operation of the fusing drive. In the case of the third operational example, during the launching period of the fusing drive, the anode duty ratio of the first electrode 15 is increased relatively compared with the anode duty ratio of the first electrode 15 in the rated drive. With this kind of drive waveform, as well as it being possible to make the cumulative energy supplied in the anode period of the first electrode 15 at the time of the fusing drive greater than the cumulative energy supplied in the anode period of the first electrode 15 at the time of the rated drive, it is possible to make the cumulative energy supplied in the latter half of the anode period of the first electrode 15 at the time of the fusing drive greater than the cumulative energy supplied in the latter half of the anode period of the first electrode 15 at the time of the rated drive, and it is possible to reliably increase the volumes of the fused portions 62 and 64 of the leading extremity sides of the first electrode 15 in comparison with the time of the rated drive during the steady operation. As the current characteristic L31 of the dotted line corresponds to the low level fusing drive for the electrode which has become a little difficult to fuse when the aging of the arc tube 1 is at the initial stage, the current characteristic L33 of the chain line corresponds to the low level fusing drive for the electrode which has become considerably difficult to fuse when the aging of the arc tube 1 has further progressed.

The description given heretofore has been one in which the volumes of the fused portions 62 and 64 are increased for only the first electrode 15 but, simply by inverting a polarity of the drive waveform, it is also possible to increase the volumes of the fused portions 62 and 64 for only the second electrode 16. Also, when repeating the initial operation and the steady operation for a plurality of cycles, it is possible to alternately increase the volumes of the fused portions 62 and 64 of the leading extremity sides of the two electrodes 15 and 16 by alternately increasing the anode duty ratio during the launching period for the first and second electrodes 15 and 16, by a unit of each initial operation. Alternatively, in the case of carrying out the fusing drive for only either one of the first electrode 15 or the second electrode 16, by the unit of each initial operation, the first electrode 15 and the second electrode 16 are alternately made the main fusion subject by carrying out the fusing drive increasing the volumes of the fused portions 62 and 64 of the leading extremity sides of the second electrode 16 as the fusing drive of the current initial operation, in the event that the fusing drive increasing the volumes of the fused portions 62 and 64 of the leading extremity sides of the first electrode 15 has been carried out in the immediately preceding initial operation, and carrying out the fusing drive increasing the volumes of the fused portions 62 and 64 of the leading extremity sides of the first electrode 15 as the fusing drive of the current initial operation, in the event that the fusing drive increasing the volumes of the fused portions 62 and 64 of the leading extremity sides of the second electrode 16 has been carried out as the fusing drive of the immediately preceding initial operation.

Figure 11A:
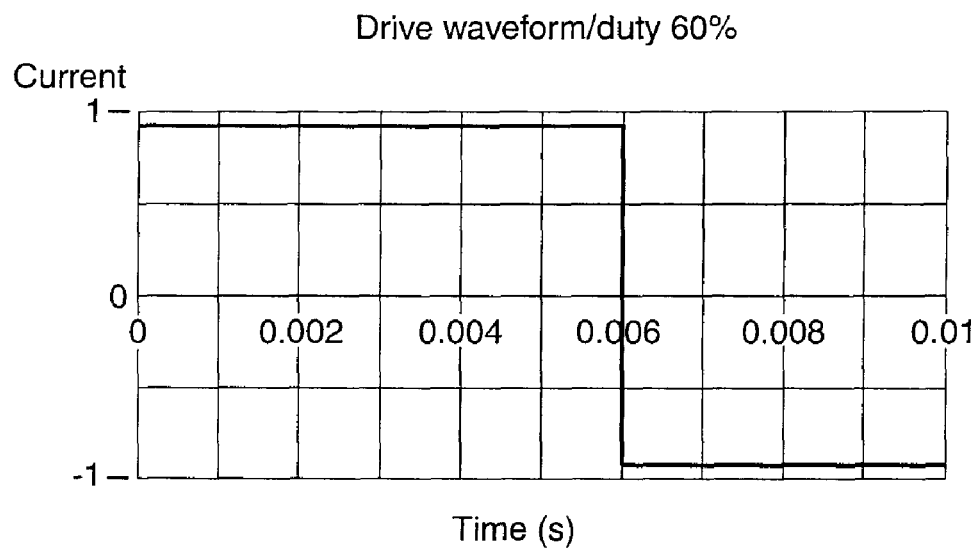
FIGS. 11A and 11B are graphs illustrating a specific relationship between a drive waveform and a temperature rise.
Figure 11B:
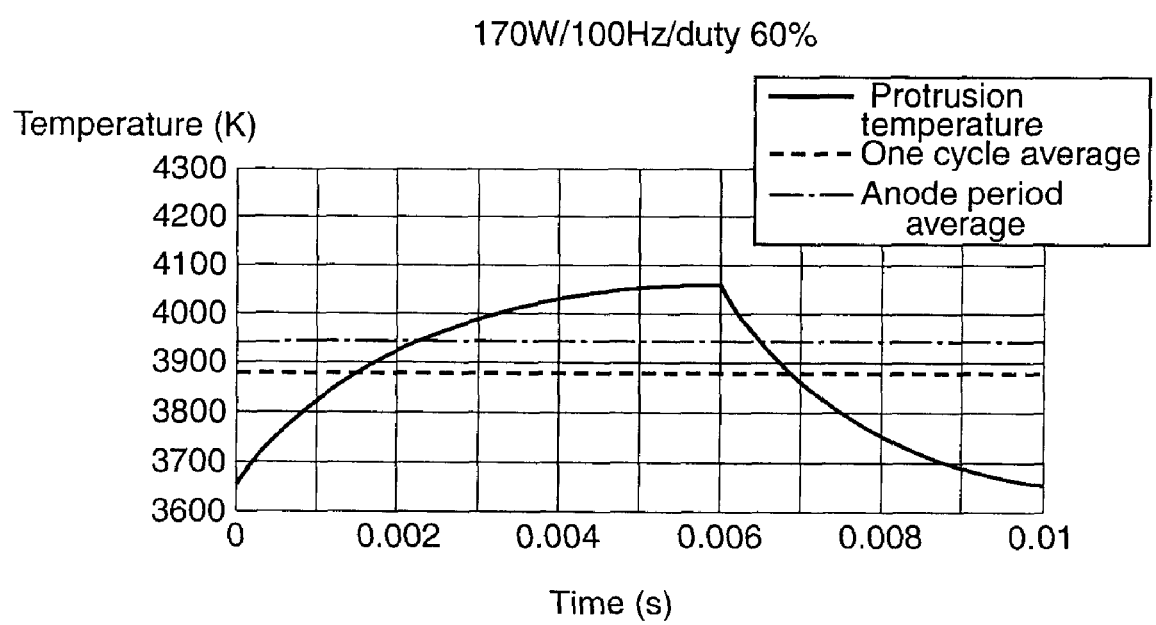

FIGS. 11A and 11B are graphs specifically illustrating an advantage of increasing the anode duty ratio in the fusing drive. FIG. 11A shows one example of a drive waveform, in the same way as FIG. 10, while FIG. 11B shows the temperature of the leading extremity 15a of the first electrode 15. In FIG. 11A, a horizontal axis shows the time, and a vertical axis shows the current. In this case, the frequency of the drive waveform is taken to be 100 Hz, and the anode duty ratio of the first electrode 15 is taken to be 60%. Also, an average power is 170 W. In FIG. 11B, a horizontal axis shows the time, and a vertical axis shows the temperature. Also, a solid line in the graph indicates a simulated temperature of the protruding leading extremity 15a, a dotted line indicates a one cycle average temperature of the leading extremity 15a, and a chain line indicates an average temperature in the anode period of the leading extremity 15a.

Figure 12A:
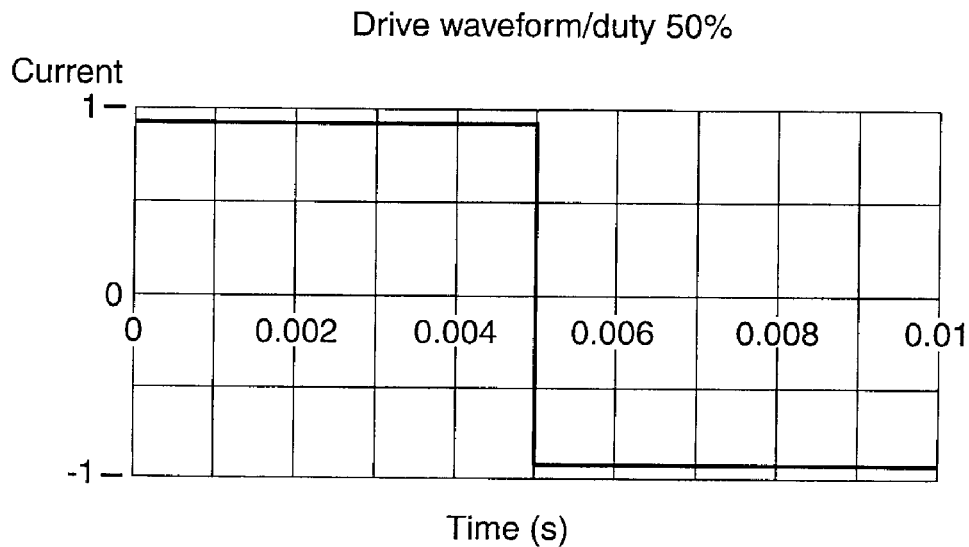
FIGS. 12A and 12B are graphs illustrating a comparison example of a relationship between a drive waveform and a temperature rise.
Figure 12B:
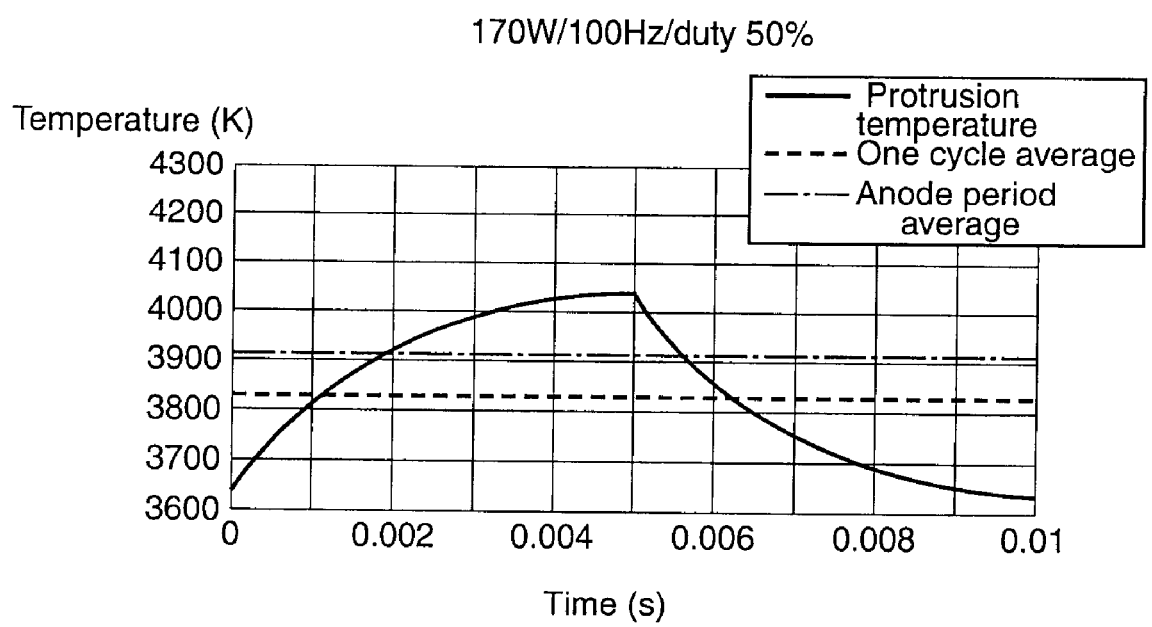

Meanwhile, FIG. 12A, being a graph for a comparison, shows one example of a drive waveform at the time of the rated drive of the steady operation, while FIG. 12B shows the temperature of the leading extremity 15a of the first electrode 15 in a case of using the drive waveform of FIG. 12A. In this case, as can be understood from FIG. 12A, the anode duty ratio of the first electrode 15 is taken to be 50%. Also, in FIG. 12B, in the same way as in FIG. 11B, a solid line in the graph indicates the simulated temperature of the protruding leading extremity 15a, a dotted line indicates the one cycle average temperature of the leading extremity 15a, and a chain line indicates the average temperature in the anode period of the leading extremity 15a. As is clear when comparing FIG. 12B and FIG. 11B, it can be understood that, compared with the case of making the anode duty ratio 50%, in the case of making the anode duty ratio of the first electrode 15 60%, as the temperature at the leading extremity 15a anode time (a peak value and an average value) and the one cycle average temperature of the leading extremity 15a rise, there is more likelihood of increasing the volumes of the leading extremity 15a and the fused portions 62 and 64 in a periphery thereof.

Hereafter, a description will be given of a specific method of calculating the simulation of the temperature rise shown in FIGS. 11B and 12B.

Figure 13A:
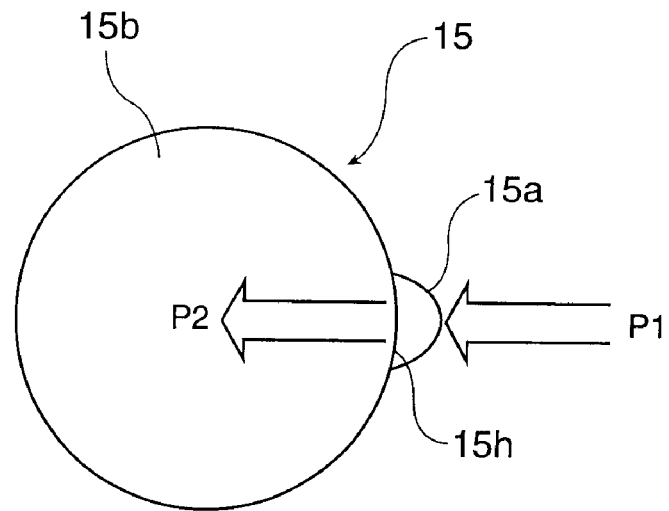

FIG. 13A is a figure schematizing the leading extremity side of the first electrode 15, and illustrating a flow of heat. The input energy P1 flowing into the leading extremity 15a of the first electrode 15 each unit time, it flows out into the main body 15b, via a contact area S of a boundary 15h, as a transmitted energy P2. Herein, the input energy P1 being one, among energies supplied to the first electrode 15, which becomes a heat energy, the transmitted energy P2 is an energy which is heat transferred from the leading extremity 15a to the main body 15b. The input energy P1, being of a value linked to the drive waveform supplied to the arc tube 1, changes with time in the same way as the drive waveform. For example, the input energy P1 when the first electrode 15 is the anode being one wherein the drive waveform in the anode period is multiplied by the coefficient α, the input energy P1 when the first electrode 15 is the cathode can be made one wherein the drive waveform in the anode period is multiplied by a coefficient β. Also, the transmitted energy P2 is a flow of heat generated by a difference in temperature between the leading extremity 15a and the main body 15b.

Figure 13B:
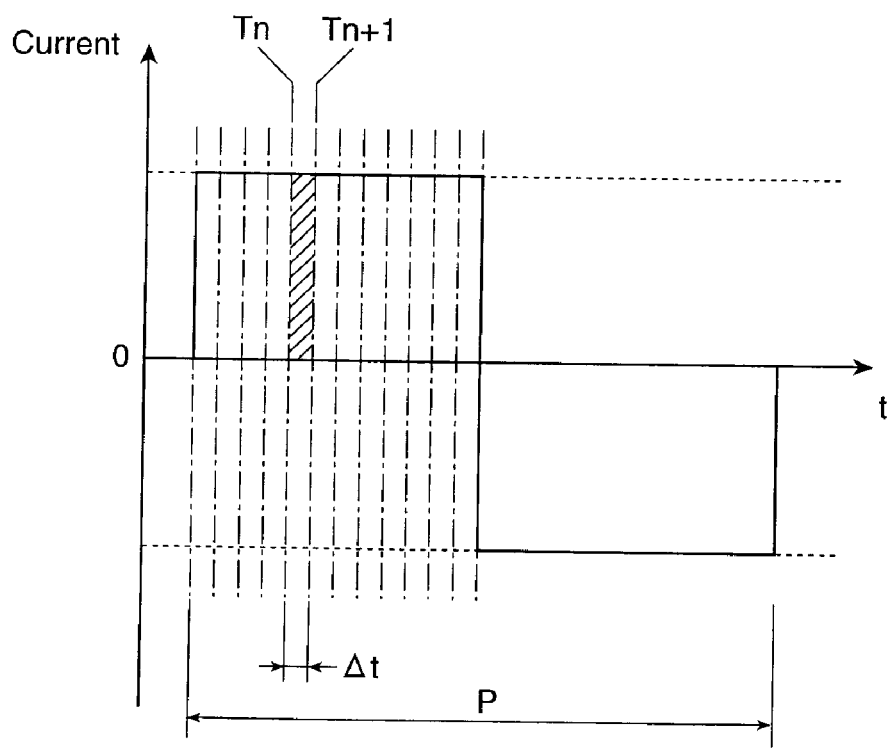
FIG. 13B is a graph showing a combination type of drive waveform for the electrode.

FIG. 13B is a graph showing a combination type of drive waveform for the first electrode 15. As shown in the figure, a cycle of the drive waveform being P, one cycle is thought of as being divided into unit times Δt which are, for example, around one thirtieth. Herein, focusing attention on an $n^{th}$ division, in order to consider a movement of heat in the leading extremity 15a, the temperature of the leading extremity 15a at a starting point of the division is taken to be Tn, and the temperature of the leading extremity 15a at a finishing point of the division is taken to be Tn+1. Herein, taking the input energy in the $n^{th}$ division to be P1n, and the transmitted energy in the $n^{th}$ division to be P2n, as a total amount of energy flowing into the leading extremity 15a is P1nΔΔt, and a total amount of energy flowing out of the leading extremity 15a is P2n×Δt, a total amount of energy accumulated in the leading extremity 15a is (P1n−P2n)×Δt. Herein, taking a heat capacity of the leading extremity 15a to be C, a temperature change ΔTn of the leading extremity 15a due to the accumulated amount of heat is $$\Delta Tn = (P1n - P2n) \times \Delta t / C \quad (1).$$

Therefore, $$Tn+1 = Tn + \Delta Tn = Tn + (P1n - P2n) \times \Delta t / C \quad (2),$$

so it is possible to calculate the temperature rise in each division. When actually calculating the temperature, T1 is fixed at an appropriate value, and the temperature rises are calculated in an order of T1, T2, T3, . . . from the heretofore described equations (1) and (2). Also, when calculating the transmitted energy P2, as well as considering the contact area S and a heat conduction rate λ, a temperature of the main body 15b is fixed at an appropriate value as a border condition. When calculating the temperatures of FIGS. 11A and 11B, the temperature of the main body 15b is taken to be 3,500K. According to the above, it is possible to calculate a temperature change characteristic of one cycle of the leading extremity 15a. The temperature change characteristic changing in accordance with a pattern of the drive waveform, it is possible to relatively compare temperature change conditions of each drive waveform pattern.

Fourth Operational Example

Figure 14:
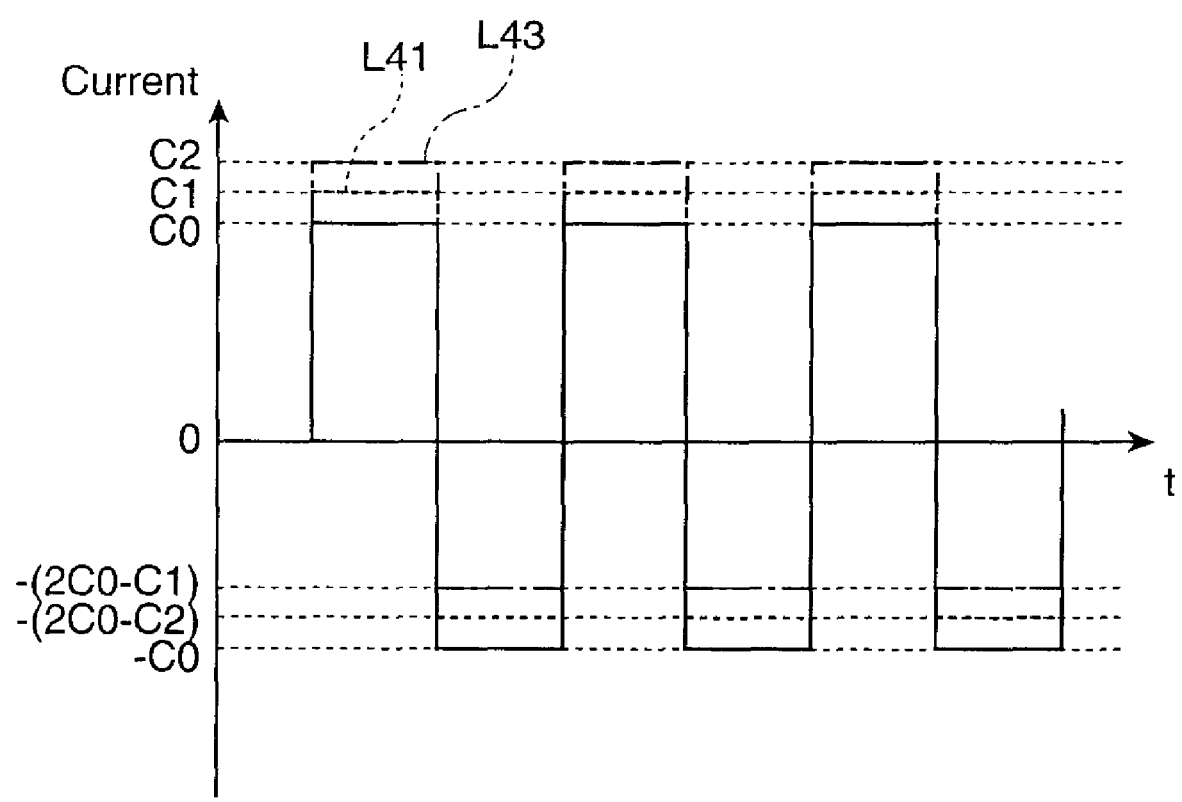
FIG. 14 is a graph illustrating another drive waveform at the launching time.

Hereafter, a description will be given of a fourth operational example with the fusing drive. FIG. 14 is a graph conceptually illustrating the initial operation of the arc tube 1, in the operational example. In the graph, a horizontal axis indicates the time, while a vertical axis indicates the current value. Also, a solid line indicates the regular initial drive initial operation, while current characteristics L41 and L43 of a dotted line and a chain line indicate the initial operation of the fusing drive. In the case of the fourth operational example, during the launching period of the fusing drive, the value of the current to the first electrode 15 is increased from C0 to C1 and C2 by superimposing the direct current. Together with this, the value of the current to the second electrode 16 is reduced to 2C0-C1 and 2C0-C2. With this kind of drive waveform, as well as it being possible to make the cumulative energy supplied in the anode period of the first electrode 15 at the time of the fusing drive greater than the cumulative energy supplied in the anode period of the first electrode 15 at the time of the rated drive, it is possible to make the cumulative energy supplied in the latter half of the anode period of the first electrode 15 at the time of the fusing drive greater than the cumulative energy supplied in the latter half of the anode period of the first electrode 15 at the time of the rated drive, and furthermore, it is possible to make the maximum value of the current supplied in the anode period of the first electrode 15 at the time of the fusing drive greater than the maximum value of the current supplied in the anode period of the first electrode 15 at the time of the rated drive during the steady operation. By this means, it is possible to reliably increase the volumes of the fused portions 62 and 64 of the leading extremity sides of the first electrode 15 in comparison with the time of the rated drive during the steady operation. As the current characteristic L41 of the dotted line corresponds to the low level fusing drive for the electrode which has become a little difficult to fuse when the aging of the arc tube 1 has progressed to a certain extent, the current characteristic L43 of the chain line corresponds to the low level fusing drive for the electrode which has become considerably difficult to fuse when the aging of the arc tube 1 has further progressed.

The description given heretofore has been one in which the volumes of the fused portions 62 and 64 are increased for only the first electrode 15 but, simply by inverting the polarity of the drive waveform, it is also possible to increase the volumes of the fused portions 62 and 64 for the second electrode 16. Also, when repeating the initial operation and the steady operation for a plurality of cycles, it is possible to alternately increase the volumes of the fused portions 62 and 64 of the leading extremity sides of the two electrodes 15 and 16 by alternately changing a polarity of the direct current superimposed during the launching period for the first and second electrodes 15 and 16, by a unit of each initial operation. Alternatively, in the case of carrying out the fusing drive for only either one of the first electrode 15 or the second electrode 16, by the unit of each initial operation, the first electrode 15 and the second electrode 16 are alternately made the main fusion subject by carrying out the fusing drive increasing the volumes of the fused portions 62 and 64 of the leading extremity sides of the second electrode 16 as the fusing drive of the current initial operation, in the event that the fusing drive increasing the volumes of the fused portions 62 and 64 of the leading extremity sides of the first electrode 15 has been carried out in the immediately preceding initial operation, and carrying out the fusing drive increasing the volumes of the fused portions 62 and 64 of the leading extremity sides of the first electrode 15 as the fusing drive of the current initial operation, in the event that the fusing drive increasing the volumes of the fused portions 62 and 64 of the leading extremity sides of the second electrode 16 has been carried out as the fusing drive of the immediately preceding initial operation.

Figure 15A:
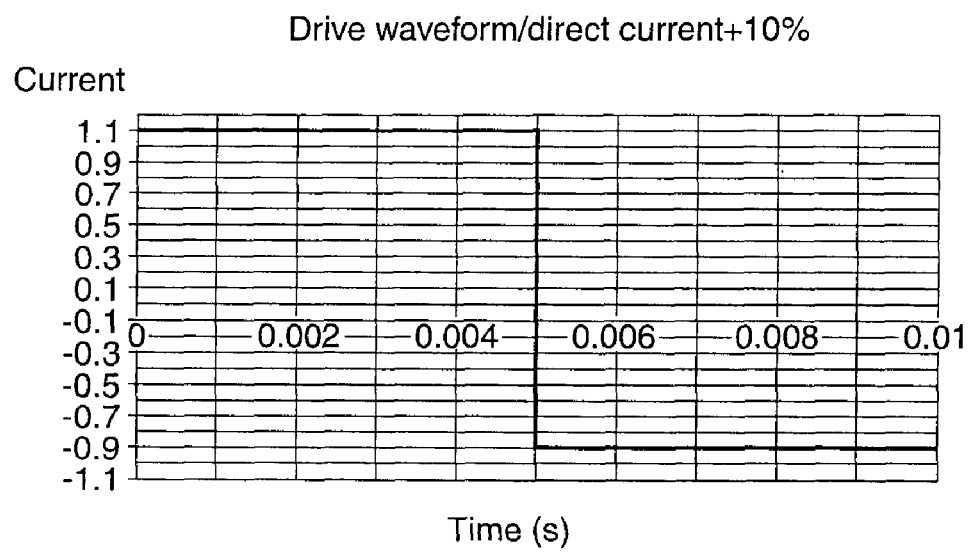
FIGS. 15A and 15B are graphs illustrating a specific relationship between a drive waveform and a temperature rise.
Figure 15B:
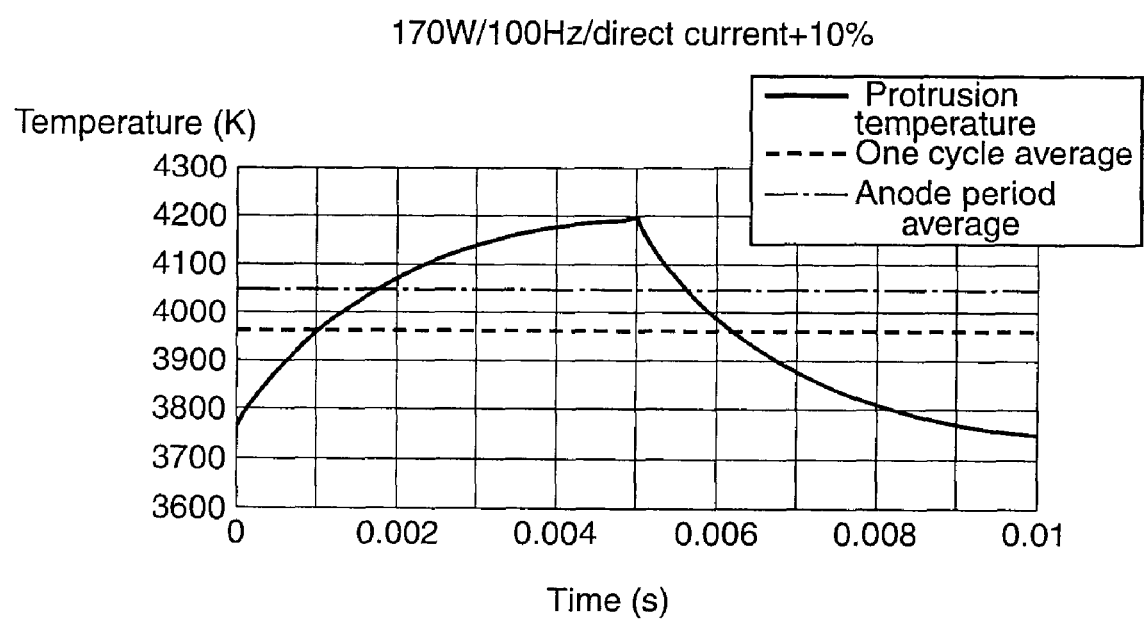

FIGS. 15A and 15B are graphs specifically illustrating an advantage of superimposing the direct current in the fusing drive. FIG. 15A shows one example of a drive waveform, in the same way as FIG. 14, while FIG. 15B shows the temperature of the leading extremity 15a of the first electrode 15. In FIG. 15A, a horizontal axis shows the time, and a vertical axis shows the current. In this case, the frequency of the drive waveform is taken to be 100 Hz, and a direct current of a size 10% of the original rectangular wave is superimposed on the side on which the first electrode 15 becomes the anode. Also, the average power is 170 W. In FIG. 15B, a horizontal axis shows the time, and a vertical axis shows the temperature. Also, a solid line in the graph indicates the simulated temperature of the protruding leading extremity 15a, a dotted line indicates the one cycle average temperature of the leading extremity 15a, and a chain line indicates the average temperature in the anode period of the leading extremity 15a. A graph with no superposition of the direct current, as a comparison example vis-à-vis FIGS. 15A and 15B, is the same as the drive waveform and the like of the rated drive in the steady operation shown in FIGS. 12A and 12B.

As is clear when comparing FIG. 15B and FIG. 12B, it can be understood that, compared with the case of there being no superposition of the direct current, in the case of superimposing the 10% direct current on the first electrode 15 side, as the temperature at the leading extremity 15a anode time (the peak value and the average value), and the one cycle average temperature and anode period average temperature of the leading extremity 15a rise, and as the temperature of the leading extremity 15a in the anode period rises overall in the latter half, there is more likelihood of increasing the volumes of the leading extremity 15a, and the fused portions 62 and 64 in the periphery thereof.

Fifth Operational Example

Figure 16A:
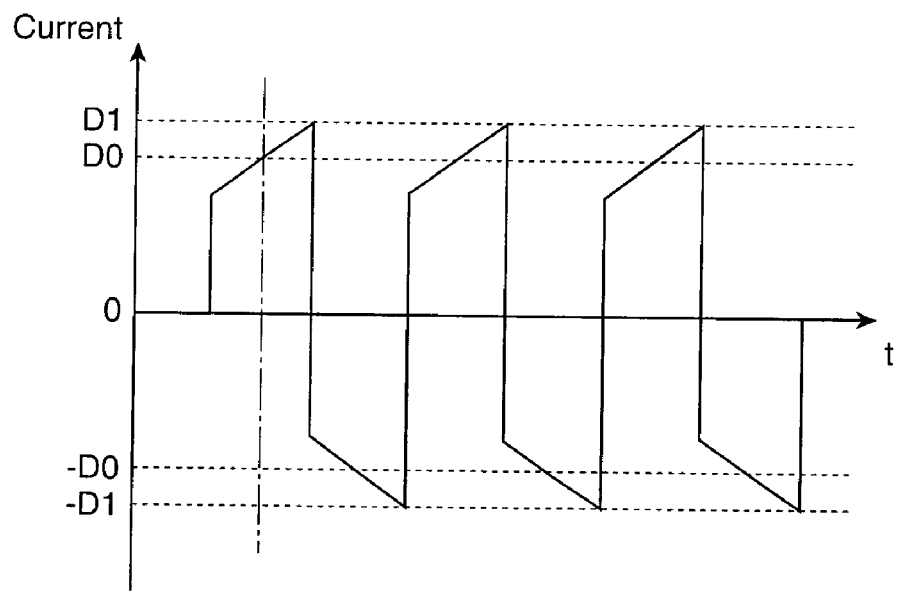
FIGS. 16A and 16B are graphs illustrating another drive waveform at the launching time.
Figure 16B:
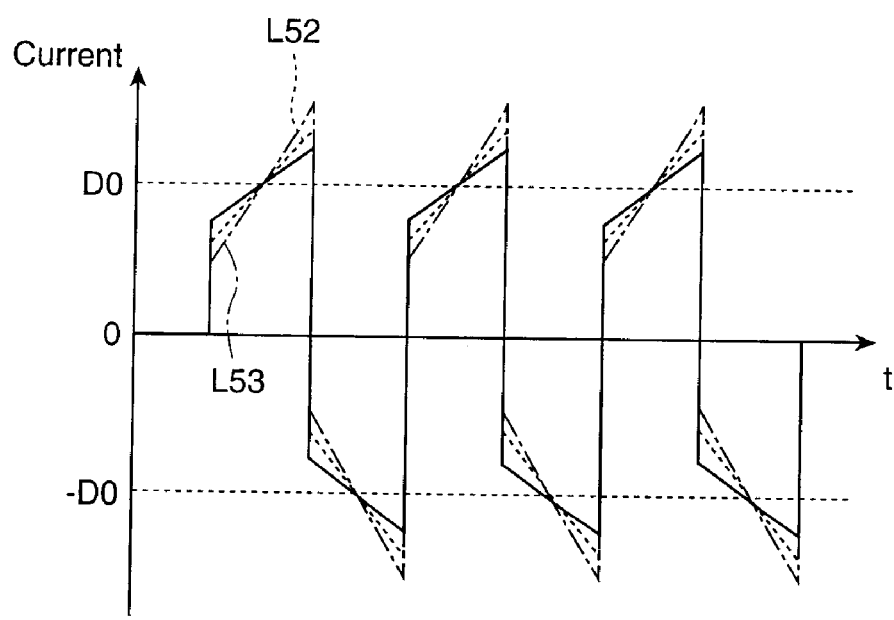

Hereafter, a description will be given of a fifth operational example with the fusing drive. FIG. 16A is a graph conceptually illustrating the initial operation of the arc tube 1, in the operational example. In the graph, a horizontal axis shows the time, and a vertical axis shows the current. In the case of the fifth operational example, during the launching period of the fusing drive, a superimposed wave, in which a gradually increasing triangular wave is superimposed on the rectangular wave, being supplied, although an average current value thereof is maintained at D0, a peak value of the superimposed wave is D1. Herein, taking a ratio of the peak value D1 with respect to the average current value D0 as the triangular wave jump rate of the superimposed wave, the triangular wave jump rate D1/D0 increases more than a triangular wave jump rate 1 of the rectangular wave. By adjusting the triangular wave jump rate, it is possible to increase the temperatures of the two electrodes 15 and 16 by a desired amount in the latter halves of the anode periods of the first and second electrodes 15 and 16. With this kind of superimposed waveform, it being possible to make the cumulative energy supplied in the latter half of the anode period of each of the first electrode 15 and the second electrode 16 at the time of the fusing drive greater than the cumulative energy supplied in the latter half of the anode period of the corresponding electrode at the time of the rated drive, it is possible to reliably increase the volumes of the fused portions 62 and 64 of the leading extremity sides of the first electrode 15 and the second electrode 16 in comparison with the time of the rated drive during the steady operation. In FIG. 16B, the current characteristic L52 of the dotted line indicates a superimposed wave type drive waveform corresponding to the low level fusing drive for the electrode which has become a little difficult to fuse when the aging of the arc tube 1 has progressed to a certain extent, and the current characteristic L53 of the chain line indicates a superimposed wave type drive waveform corresponding to the low level fusing drive for the electrode which has become considerably difficult to fuse when the aging of the arc tube 1 has further progressed.

The description given heretofore has been one in which the volumes of the fused portions 62 and 64 are increased for both the first and second electrodes 15 and 16, but it is possible to increase the volumes of the fused portions 62 and 64 for only either one of the first electrode 15 or the second electrode 16. In this case, the triangular wave jump rate of the superimposed wave of only either one of the first electrode 15 or the second electrode 16 is increased when it becomes the anode. Furthermore, in the event of alternately increasing the triangular wave jump rate for the first and second electrodes 15 and 16 during the launching period, by a unit of each initial operation, it is possible to alternately heat the leading extremity sides of the two electrodes 15 and 16 in a balanced manner. Alternatively, in the case of carrying out the fusing drive for only either one of the first electrode 15 or the second electrode 16, by the unit of each initial operation, the first electrode 15 and the second electrode 16 are alternately made the main fusion subject by carrying out the fusing drive increasing the volumes of the fused portions 62 and 64 of the leading extremity sides of the second electrode 16 as the fusing drive of the current initial operation, in the event that the fusing drive increasing the volumes of the fused portions 62 and 64 of the leading extremity sides of the first electrode 15 has been carried out in the immediately preceding initial operation, and carrying out the fusing drive increasing the volumes of the fused portions 62 and 64 of the leading extremity sides of the first electrode 15 as the fusing drive of the current initial operation, in the event that the fusing drive increasing the volumes of the fused portions 62 and 64 of the leading extremity sides of the second electrode 16 has been carried out as the fusing drive of the immediately preceding initial operation.

Figure 17A:
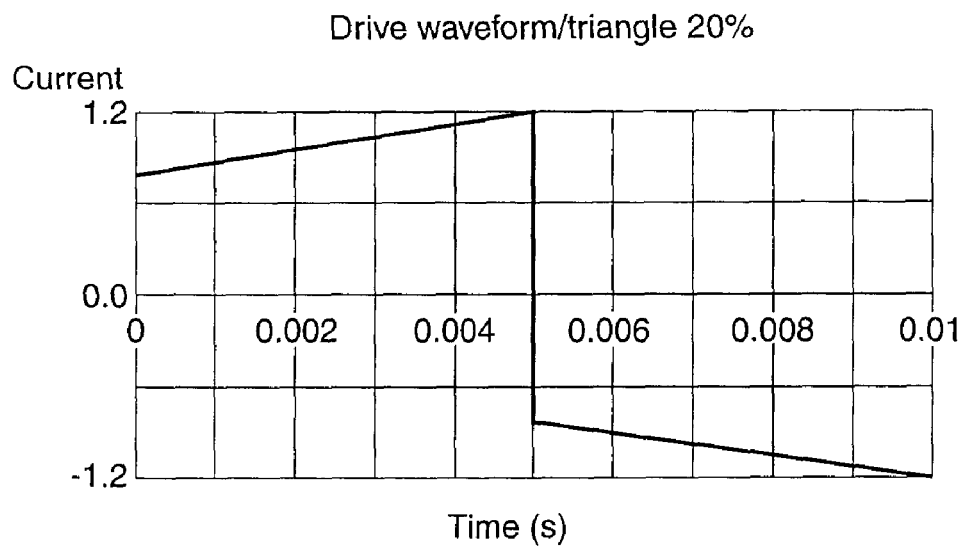
FIGS. 17A and 17B are graphs illustrating a specific relationship between a drive waveform and a temperature rise.
Figure 17B:
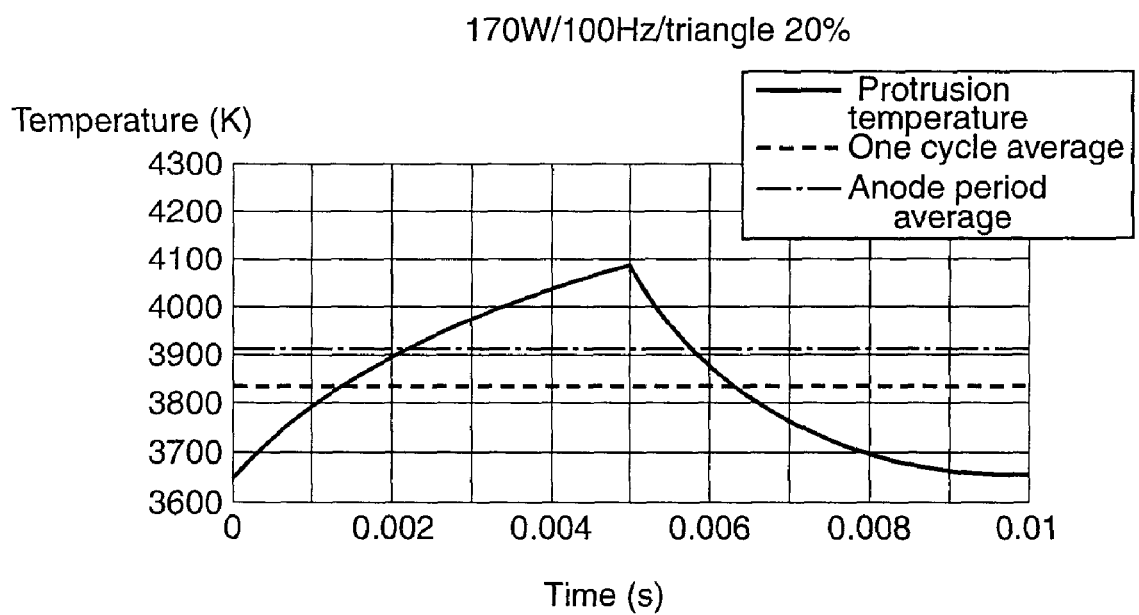

FIGS. 17A and 17B are graphs specifically illustrating an advantage of superimposing the triangular wave in the fusing drive. FIG. 17A shows one example of a drive waveform, in the same way as FIG. 16A, while FIG. 17B shows the temperature of the leading extremity 15a of the first electrode 15. In FIG. 17A, a horizontal axis shows the time, and a vertical axis shows the current value. In this case, the frequency of the drive waveform is taken to be 100 Hz, and the triangular wave jump rate of the superimposed wave is taken to be 20%. Also, the average power is 170 W. In FIG. 17B, a horizontal axis shows the time, and a vertical axis shows the temperature. Also, a solid line in the graph indicates the simulated temperature of the protruding leading extremity 15a, a dotted line indicates the one cycle average temperature of the leading extremity 15a, and a chain line indicates the average temperature in the anode period of the leading extremity 15a.

Figure 18A:
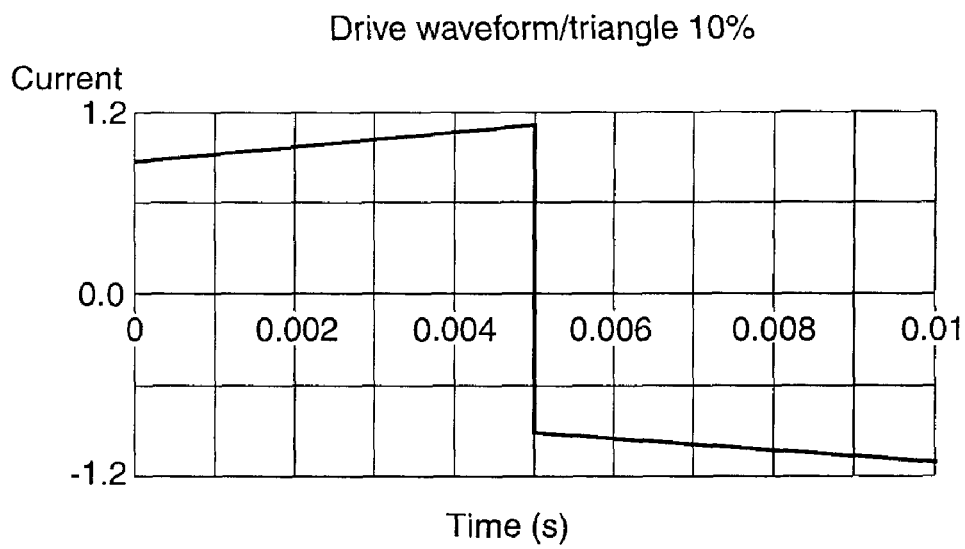
FIGS. 18A and 18B are graphs illustrating a comparison example of a relationship between a drive waveform and a temperature rise.
Figure 18B:
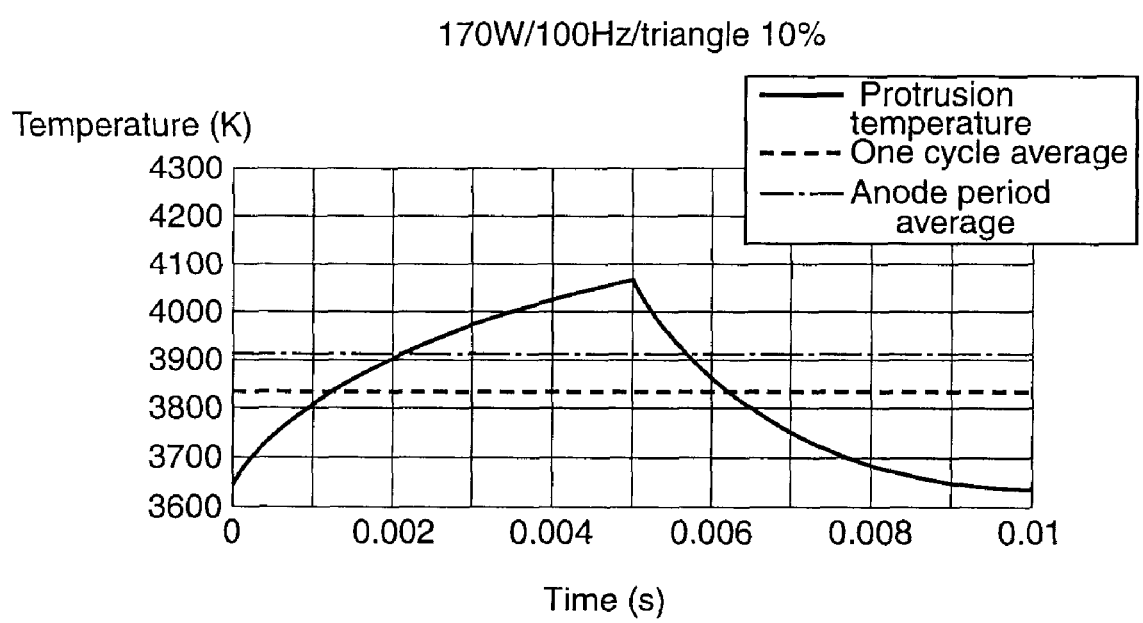

Meanwhile, FIG. 18A, being a graph for a comparison, shows one example of a drive waveform of the rated drive in the steady operation, while FIG. 18B shows the temperature of the leading extremity 15a of the first electrode 15 in a case of using the drive waveform of FIG. 18A. In this case, as can be understood from FIG. 18A, the triangular wave jump rate of the superimposed wave is taken to be 10%. Also, in FIG. 18B, in the same way as in FIG. 17B, a solid line in the graph indicates the simulated temperature of the protruding leading extremity 15a, a dotted line indicates the one cycle average temperature of the leading extremity 15a, and a chain line indicates the average temperature in the anode period of the leading extremity 15a. As is clear when comparing FIG. 18B and FIG. 17B, it can be understood that, compared with the case of making the triangular wave jump rate 10%, in the case of making the triangular wave jump rate 20%, as the temperature at the leading extremity 15a anode time (the peak value and the average value) and the one cycle average temperature of the leading extremity 15a rise, and as the temperatures of the leading extremities 15a and 16a in the anode periods rise farther in the latter half, there is more likelihood of increasing the volumes of the leading extremities 15a and 16a, and the fused portions 62 and 64 on the peripheries thereof.

In the fifth operational example, a peak position of the superimposed wave is arranged to be at an end of the anode period by superimposing the gradually increasing triangular wave on the rectangular wave, but it is also possible to arrange for the peak position to come at an optional time during the anode period. For example, it is also acceptable to arrange in such a way that, superimposing the gradually increasing triangular wave on the rectangular wave, the peak position comes at a beginning of the anode period. In this case, the cumulative energy supplied in the former half of the anode period of each of the first electrode 15 and the second electrode 16 is greater at the time of the fusing drive than at the time of the rated drive. Generally, by making the cumulative energy supplied to the electrode in at least one portion of the anode period greater than at the time of the rated drive, it is possible to increase the temperatures of the electrodes 15 and 16 by a desired amount. For this reason, it is possible to reliably increase the volumes of the fused portions 62 and 64 of the leading extremity sides of the first electrode 15 and the second electrode 16 in comparison with the time of the rated drive during the steady operation. However, from a point of being able to increase the temperatures of the electrodes 15 and 16 when switching from the anode to the cathode, and being able to stabilize the position of the arc, it is preferable to arrange that the peak position of the superimposed wave comes at the end of the anode period.

Sixth Operational Example

Figure 19A:
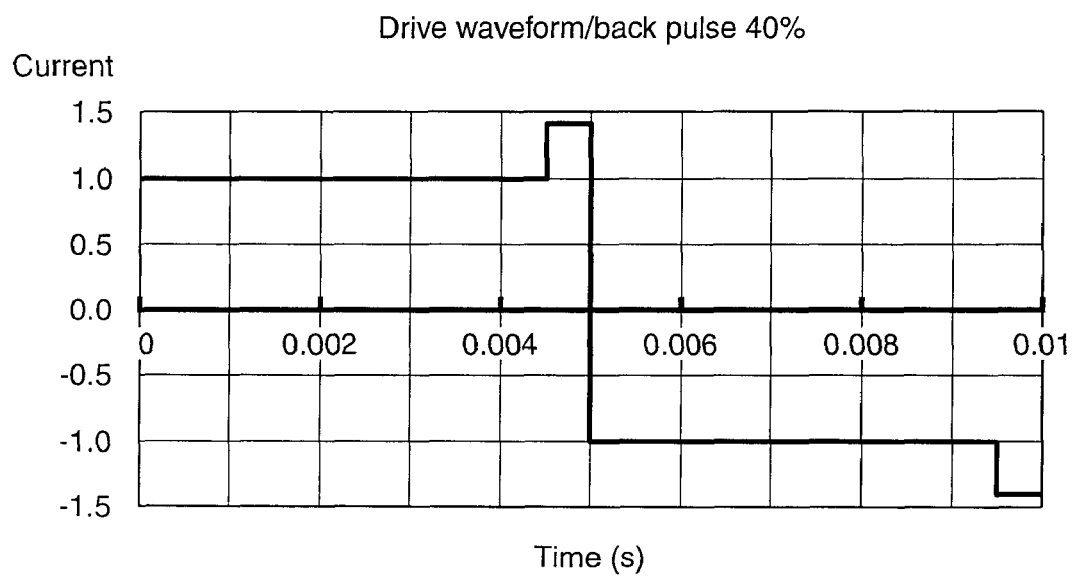
FIGS. 19A and 19B are graphs illustrating another relationship between a drive waveform and a temperature rise at the launching time.
Figure 19B:
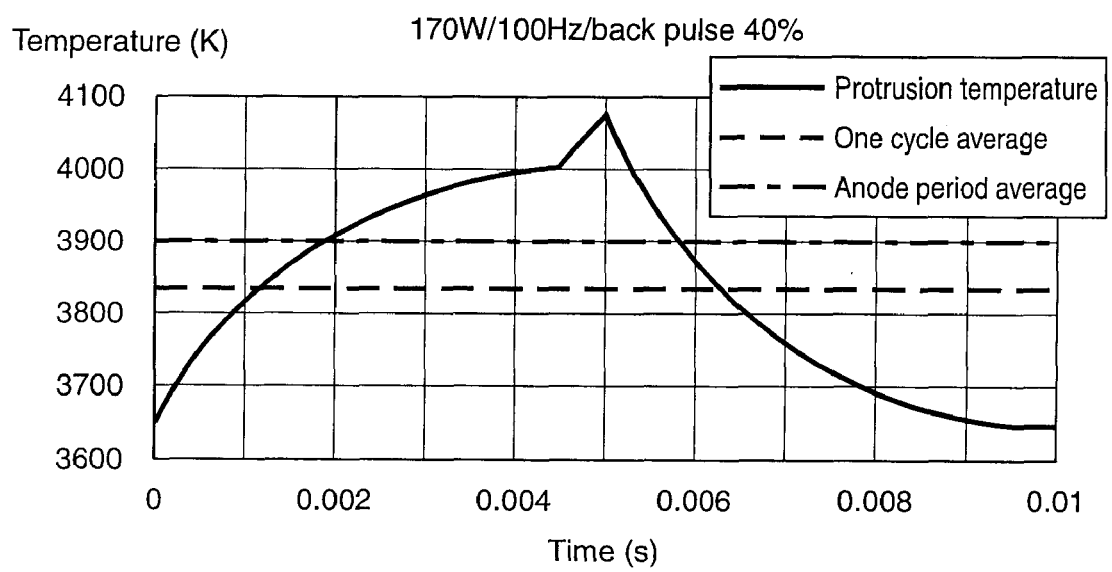

Hereafter, a description will be given of a sixth operational example with the fusing drive. FIG. 19A shows the initial operation of the arc tube 1 in the operational example, while FIG. 19B shows the temperature of the leading extremity 15a of the first electrode 15. In FIG. 19A, a horizontal axis shows the time, and a vertical axis shows the current value. In this case, the frequency of the drive waveform is taken to be 100 Hz, and the drive waveform is such that a pulse wave is superimposed on an end portion of former and latter half cycles of the rectangular wave, the pulse wave having a height 40% of the former half. Also, the average power is 170 W. Meanwhile, in FIG. 19B, a horizontal axis shows the time, and a vertical axis shows the temperature. Also, a solid line in the graph indicates the simulated temperature of the protruding leading extremity 15a, a dotted line indicates the one cycle average temperature of the leading extremity 15a, and a chain line indicates the average temperature in the anode period of the leading extremity 15a.

Figure 20A:
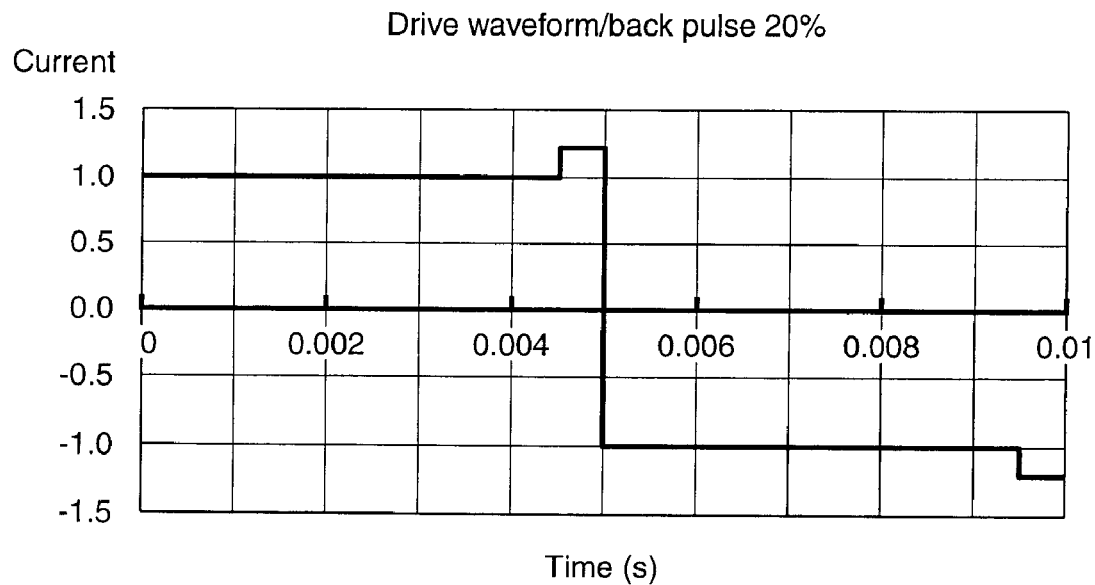
FIGS. 20A and 20B are graphs illustrating a comparison example of a relationship between a drive waveform and a temperature rise.
Figure 20B:
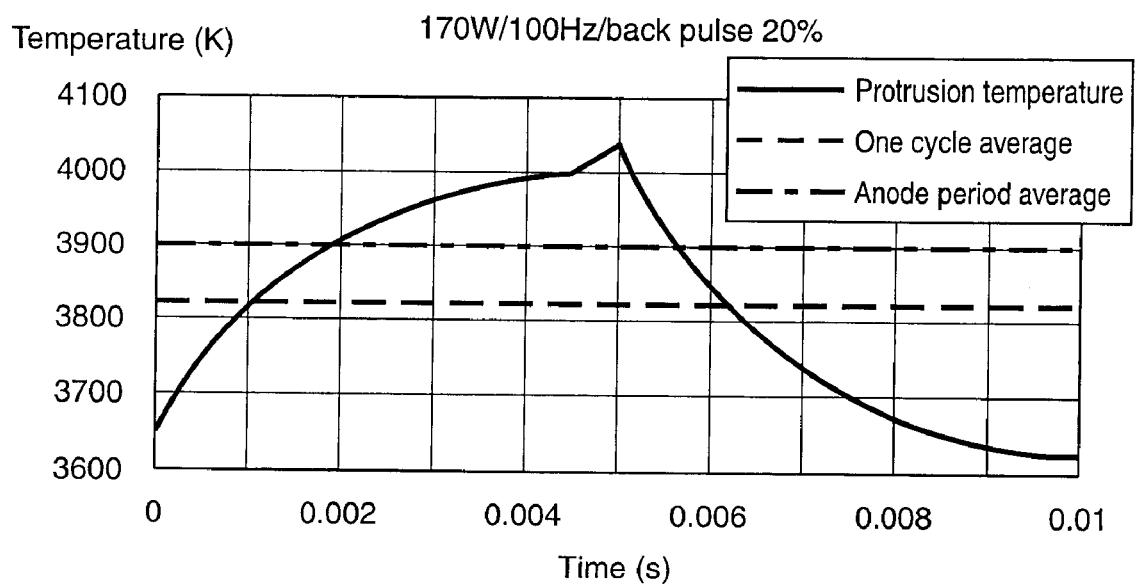

Meanwhile, FIG. 20A, being a graph for a comparison, shows one example of a drive waveform of the rated drive in the steady operation, while FIG. 20B shows the temperature of the leading extremity 15a of the first electrode 15 in a case of using the drive waveform of FIG. 20A. In this case, as can be understood from FIG. 20A, the drive waveform is such that a pulse wave is superimposed on the end portion of the former and latter half cycles of the rectangular wave, the pulse wave having a height 20% of the former half. Also, in FIG. 20B, in the same way as in FIG. 19B, a solid line in the graph indicates the simulated temperature of the protruding leading extremity 15a, a dotted line indicates the one cycle average temperature of the leading extremity 15a, and a chain line indicates the average temperature in the anode period of the leading extremity 15a. As is clear when comparing FIG. 20B and FIG. 19B, it can be understood that, compared with the case of superimposing the 20% projection, in the case of superimposing the 40% projection, as the peak values of the temperatures of the leading extremities 15a and 16a in the anode periods rise, there is more likelihood of increasing the volumes of the leading extremities 15a and 16a, and the fused portions 62 and 64 on the peripheries thereof. That is, with the drive waveform wherein a pulse wave is superimposed at the end of the rectangular wave, it is possible to make the cumulative energy supplied in the latter half of the anode period of each of the first electrode 15 and the second electrode 16 at the time of the fusing drive greater than the cumulative energy supplied in the latter half of the anode period of the corresponding electrode at the time of the rated drive, and furthermore, it is possible to make the maximum value of the current supplied in the anode period of each of the first electrode 15 and the second electrode 16 at the time of the fusing drive greater than the maximum value of the current supplied in the anode period of the first electrode 15 at the time of the rated drive during the steady operation. By this means, there is more likelihood of increasing the volumes of the fused portions 62 and 64 at the time of the fusing drive, compared with the time of the rated drive.

The description given heretofore has been one in which the volumes of the fused portions 62 and 64 are increased for both the first and second electrodes 15 and 16, but it is possible to increase the volumes of the fused portions 62 and 64 for only either one of the first electrode 15 or the second electrode 16. In this case, the projection is superimposed on the rectangular wave only when either one of the first electrode 15 or the second electrode 16 becomes the anode. In this way, in the case of carrying out the fusing drive for only either one of the first electrode 15 or the second electrode 16, the first electrode 15 and the second electrode 16 are alternately made the main fusion subject by carrying out the fusing drive increasing the volumes of the fused portions 62 and 64 of the leading extremity sides of the second electrode 16 as the fusing drive of the current initial operation, in the event that the fusing drive increasing the volumes of the fused portions 62 and 64 of the leading extremity sides of the first electrode 15 has been carried out in the immediately preceding initial operation, and carrying out the fusing drive increasing the volumes of the fused portions 62 and 64 of the leading extremity sides of the first electrode 15 as the fusing drive of the current initial operation, in the event that the fusing drive increasing the volumes of the fused portions 62 and 64 of the leading extremity sides of the second electrode 16 has been carried out as the fusing drive of the immediately preceding initial operation.

Also, with the low level fusing drive for the electrode when the aging of the arc tube 1 has progressed to a certain extent, it is possible to secure the volumes of the leading extremities 15a and 16a, and the fused portions 62 and 64 on the peripheries thereof, by further increasing a height and width of the pulse wave superimposed on the end portion of the former and latter half cycles of the rectangular wave.

Seventh Operational Example

Figure 21A:
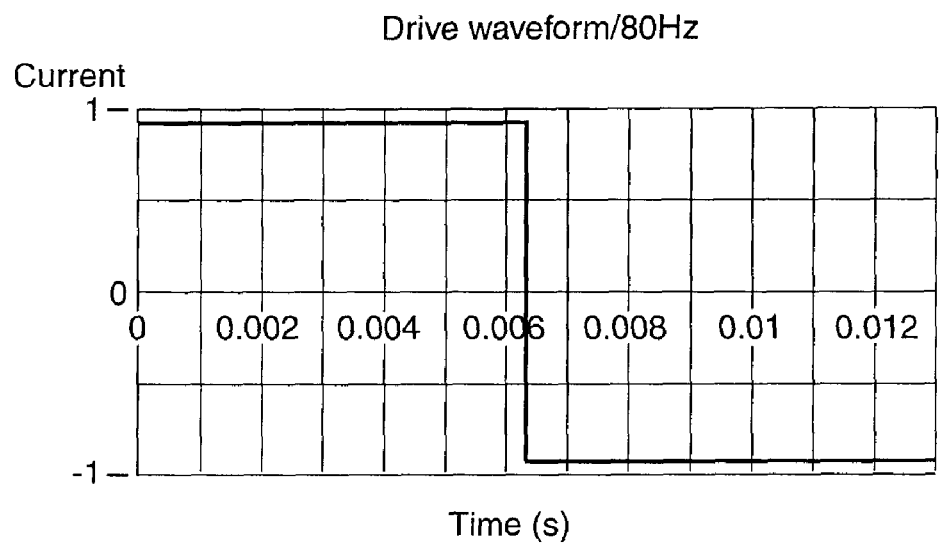
FIGS. 21A and 21B are graphs illustrating another relationship between a drive waveform and a temperature rise at the launching time.
Figure 21B:
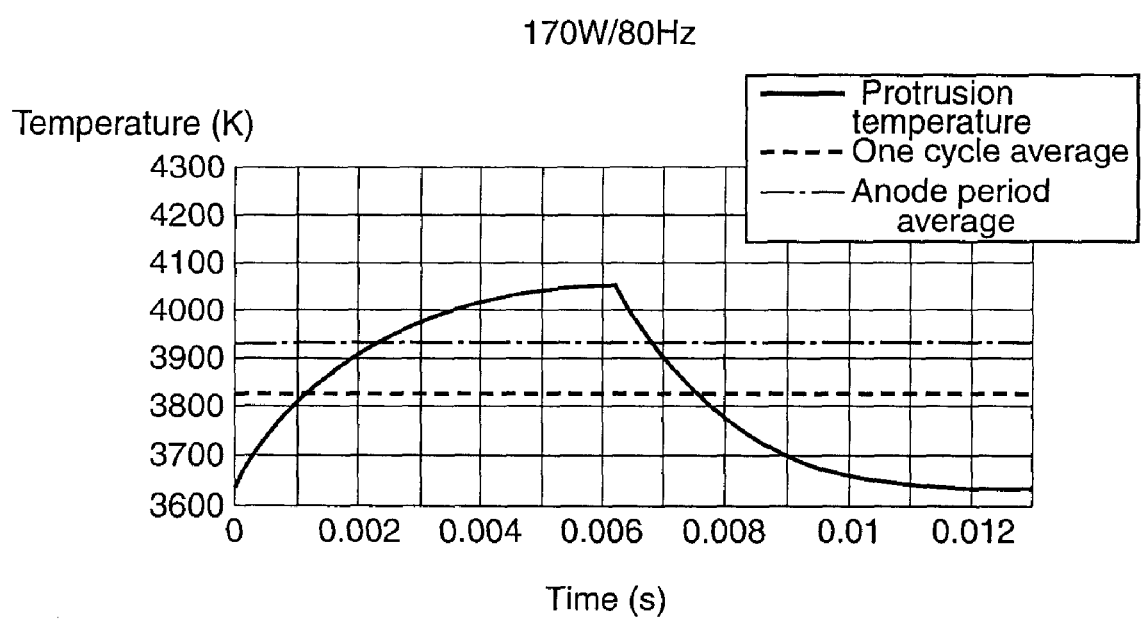

Hereafter, a description will be given of a seventh operational example with the fusing drive. FIG. 21A shows the initial operation of the arc tube 1, in the operational example, while FIG. 21B shows the temperature of the leading extremity 15a of the first electrode 15. In FIG. 21A, a horizontal axis shows the time, and a vertical axis shows the current value. In this case, the frequency of the drive waveform is taken to be 80 Hz, and the average power is 170 W. Meanwhile, in FIG. 21B, a horizontal axis shows the time, and a vertical axis shows the temperature. Also, a solid line in the graph indicates the simulated temperature of the protruding leading extremity 15a, a dotted line indicates the one cycle average temperature of the leading extremity 15a, and a chain line indicates the average temperature in the anode period of the leading extremity 15a. A graph with a frequency of 100 Hz, as a comparison example vis-à-vis FIGS. 21A and 21B, is the same as the drive waveform and the like of the rated drive in the steady operation shown in FIGS. 12A and 12B.

As is clear when comparing FIG. 21B and FIG. 12B, it can be understood that, in the case of making the frequency lower, as the maximum temperature of the leading extremity 15a in the anode period and the average temperature of the leading extremity 15a in the anode period rise, and the temperatures of the leading extremities 15a and 16a in the anode period rise overall in the latter half, there is more likelihood of increasing the volumes of the leading extremities 15a and 16a, and the fused portions 62 and 64 on the peripheries thereof. That is, with the drive waveform wherein the frequency of the rectangular wave and the like is reduced, as well as it being possible to make the cumulative energy supplied in the anode period of each of the first electrode 15 and the second electrode 16 at the time of the fusing drive greater than the cumulative energy supplied in the latter half of the anode period of the corresponding electrode at the time of the rated drive, it is possible to make the cumulative energy supplied in the latter half of the anode period of each of the first electrode 15 and the second electrode 16 at the time of the fusing drive greater than the cumulative energy supplied in the latter half of the anode period of the corresponding electrode at the time of the rated drive. By this means, there is more likelihood of increasing the volumes of the fused portions 62 and 64 at the time of the fusing drive, compared with the time of the rated drive.

Also, with the low level fusing drive for the electrode when the aging of the arc tube 1 has progressed to a certain extent, it is possible to secure the volumes of the leading extremities 15a and 16a, and the fused portions 62 and 64 on the peripheries thereof, by further reducing the frequency.

Specific Control Example

Figure 22:
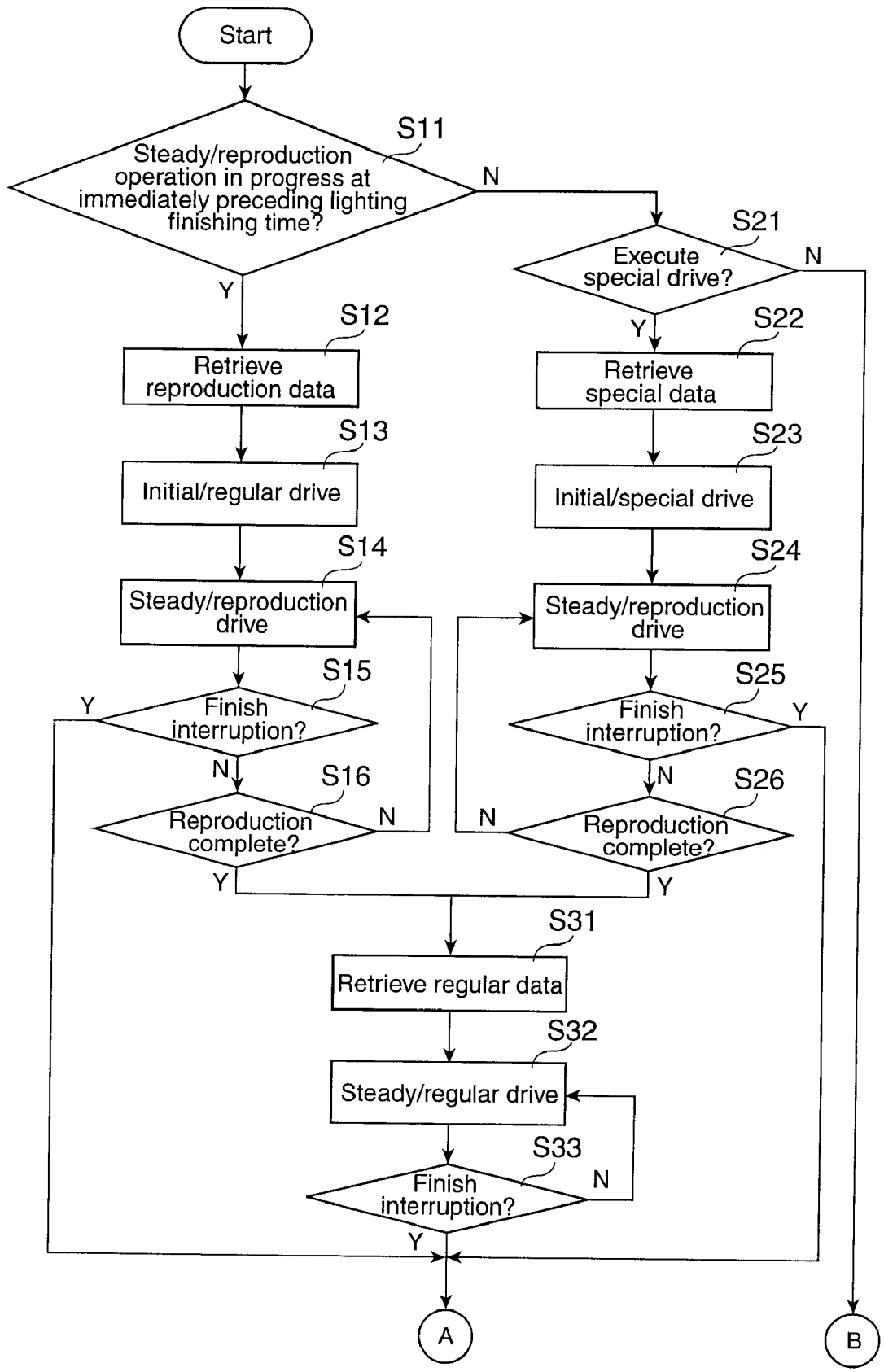
FIG. 22 is a flowchart illustrating operations of the light source apparatus shown in FIG. 1 etc.
Figure 23:
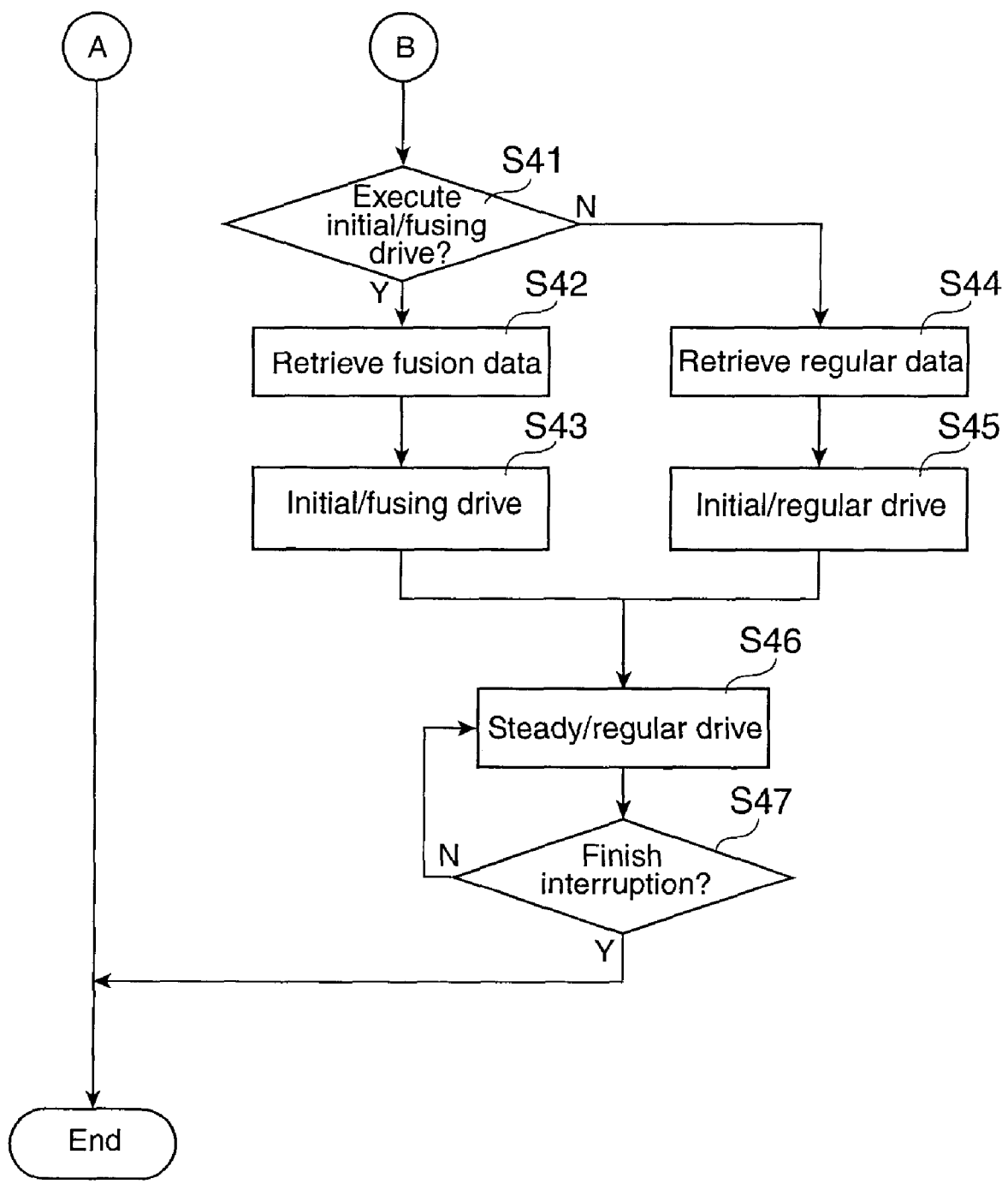
FIG. 23 is a flowchart illustrating operations of the light source apparatus shown in FIG. 1 etc.

FIGS. 22 and 23 are flowcharts illustrating operations of the light source drive device 70. Firstly, after turning on a power and before the start of the lighting, the evaluating portion 75 retrieves operational information of an immediately preceding lighting time of the light source unit 10 from the data storage portion 76, and determines whether or not, in the immediately preceding lighting of the light source unit 10, a reproduction drive corresponding to the kind of special operation illustrated in FIG. 5B and FIG. 5C has been in progress at a point of switching from the steady operation to a turning off operation (step S11).

If it is determined in step S11 that, in the immediately preceding lighting of the light source unit 10, a reproduction drive has been in progress at the point of switching from the steady operation to the turning off operation, a regular initial drive power supply condition, among power supply conditions of the initial operation, is retrieved from a drive control table stored in the data storage portion 76, and a reproduction drive power supply condition, among power supply conditions of the steady operation, is retrieved (step S12). In the event that the reproduction drive has been interrupted in the immediately preceding lighting, it is arranged in such a way that the reproduction of the extremity is restarted, and an appropriate restorative operation is executed, without executing again from the fusing drive.

Next, the controller 70b, controlling the lighting device 70a based on the regular initial drive power supply condition of the initial operation retrieved in step S12, controls the regular initial drive of the initial operation, including the launching operation, from the starting of the arc tube 1 (step S13).

Next, the controller 70b, controlling the lighting device 70a based on the reproduction drive power supply condition of the steady operation retrieved in step S12, controls the reproduction drive of the steady operation of the arc tube 1 (step S14).

Herein, the evaluating portion 75 determines whether or not, during the steady operation, an interrupting request signal requesting a finish of the light source unit 10 lighting operation has been input (step S15). If there has been an input of this kind of interrupting request signal, a process is interrupted even when the reproduction drive is in progress, the fact that the reproduction drive has been in progress at the point of switching from the steady operation to the turning off operation is recorded in the data storage portion 76, and a shift is made to the turning off operation.

If it is determined, in step S15, that there has been no input of an interrupting request signal requesting the finish of the light source unit 10 lighting operation, the evaluating portion 75 determines whether or not the reproduction drive is completed (step S16). If the reproduction drive is not completed, that is, in the event that the reproduction drive is in progress, the controller 70b returns to step S14, and continues the reproduction drive. The reproduction drive being executed at an outset of the steady operation, in the event that a large leading extremity 15a or 16a has grown at the leading extremity side of the subject electrode, of the two electrodes 15 and 16, it is determined that the reproduction drive is completed.

If it is determined, in step S16, that the reproduction drive is completed, the controller 70b records the fact that the reproduction drive is completed in the data storage portion 76, and retrieves a regular steady drive power supply condition of the steady operation from the drive control table stored in the data storage portion 76 (step S31). Specifically, a setting value of a current value, a frequency, a triangular wave jump rate, a duty ratio and the like, for the regular steady drive at the time of the steady operation, are retrieved.

If it is determined in step S11 that, in the immediately preceding lighting of the light source unit 10, no reproduction drive has been in progress at the point of switching from the steady operation to the turning off operation, the evaluating portion 75 retrieves the operational information of the immediately preceding lighting time of the light source unit 10 from the data storage portion 76, and determines whether or not a special operation should be executed in the initial operation of the arc tube 1 (step S21).

Specifically, in the event that the cumulative lit time has exceeded a predetermined value at an immediately preceding lighting finishing point and, as illustrated in FIG. 5A, the aging of the arc tube 1 has progressed and reached a condition calling for restoration, wherein a complete restoration of the electrode leading extremity is needed, it is determined that the high level fusing drive should be executed in the initial operation. In this step S21, it is also possible to determine whether a fusing drive for a repair or for a restoration should be executed, depending on whether or not a voltage supplied to the arc tube 1 at the time of the steady operation before the immediately preceding lighting finish is as high as, or higher than, a voltage indicating the kind of condition calling for restoration, as illustrated in FIG. 5A, wherein the aging of the arc tube 1 has progressed and the complete restoration of the electrode leading extremity is needed.

Next, the evaluating portion 75, as an associated process of step S21, determines which of the first electrode 15 and the second electrode 16 to carry out the fusing drive for. Specifically, when the high level fusing drive corresponding to the immediately preceding special operation has been executed, in the event that a first high level fusing drive, which fuses the leading extremity side (the leading extremity 15a etc.) of the first electrode 15 more than the leading extremity side (the leading extremity 16a etc.) of the second electrode 16, has been executed, the evaluating portion 75, as well as determining that a second high level fusing drive, which fuses the leading extremity side (the leading extremity 16a etc.) of the second electrode 16 more than the leading extremity side (the leading extremity 15a etc.) of the first electrode 15, should be executed as the high level fusing drive on the current occasion, stores this information in the data storage portion 76. That is, the evaluating portion 75, when carrying out the high level fusing drive corresponding to the special operation, determines which, of the first high level fusing drive and the second high level fusing drive, to execute as the high level fusing drive corresponding to the special operation on the current occasion, in order that the first high level fusing drive and the second high level fusing drive are carried out alternately.

Next, the evaluating portion 75, as an associated process of step S21, determines on whose leading extremity side, the first electrode 15 or the second electrode 16, to carry out the reproduction drive of the special operation. Specifically, in the event that it is determined that the first high level fusing drive, which forms the fused portion 62 (refer to FIG. 5B) on the first electrode 15 side in the high level fusing drive of the special operation, is to be executed, the evaluating portion 75 determines that a first reproduction drive, which reproduces the leading extremity 15a of the first electrode 15 in the steady drive of the special operation, should be executed, while in the event that it is determined that the second high level fusing drive, which forms the fused portion 62 (refer to FIG. 5B) on the second electrode 16 side in the fusing drive, is to be executed, the evaluating portion 75 determines that a second reproduction drive, which reproduces the leading extremity 16a of the second electrode 16 in the steady drive of the special operation, should be executed.

If it is determined, in step S21, that the high level fusing drive of the special operation should be executed as the initial operation of the arc tube 1, the controller 70b, in accordance with the evaluation result of step S21, retrieves a special operation high level fusing drive power supply condition, among the power supply conditions of the initial operation and, in accordance with the evaluation result of step S21, retrieves a special operation reproduction drive power supply condition, among the power supply conditions of the steady operation, from the drive control table stored in the data storage portion 76 (step S22). Specifically, a setting value of a current value, a frequency, a duty ratio and the like, for the high level fusing drive are retrieved, and the setting value of the current value, the frequency, the triangular wave jump rate, the duty ratio and the like, for the reproduction drive are retrieved.

Next, the controller 70b, controlling the lighting device 70a based on the high level fusing drive power supply condition of the initial operation retrieved in step S22, controls the high level fusing drive of the initial operation, including the launching operation, from the starting of the arc tube 1 (step S23).

Next, the controller 70b, controlling the lighting device 70a based on the reproduction drive power supply condition of the steady operation retrieved in step S22, controls the reproduction drive of the steady operation of the arc tube 1 (step S24).

Herein, the evaluating portion 75 determines whether or not, during the steady operation, an interrupting request signal requesting the finish of the light source unit 10 lighting operation has been input (step S25). If there has been an input of this kind of interrupting request signal, the process is interrupted even when the reproduction drive is in progress, the fact that the reproduction drive has been in progress at the point of switching from the steady operation to the turning off operation is recorded in the data storage portion 76, and a shift is made to the turning off operation.

If it is determined, in step S25, that there has been no input of an interrupting request signal requesting the finish of the light source unit 10 lighting operation, the evaluating portion 75 determines whether or not the reproduction drive is completed (step S26). If the reproduction drive is not completed, that is, in the event that the reproduction drive is in progress, the controller 70b returns to step S24, and continues the reproduction drive. The reproduction drive being executed at the outset of the steady operation, in the event that a large leading extremity 15a or 16a has grown at the leading extremity side of the subject electrode, of the two electrodes 15 and 16, it is determined that the reproduction drive is completed.

If it is determined, in step S26, that the reproduction drive is completed, the controller 70b records the fact that the reproduction drive is completed in the data storage portion 76, and retrieves the regular steady drive power supply condition of the steady operation from the drive control table stored in the data storage portion 76 (step S31). Specifically, the setting value of the current value, the frequency, the triangular wave jump rate, the duty ratio and the like, for the regular steady drive at the time of the steady operation, are retrieved.

Next, the controller 70b, based on the regular steady drive power supply condition of the steady operation retrieved in step S31, controls the operating condition of the lighting device 70a, that is, the regular steady drive of the steady operation of the arc tube 1 (step S32).

Herein, the evaluating portion 75 determines whether or not, during the steady operation, an interrupting request signal requesting the finish of the light source unit 10 lighting operation has been input (step 33). If there has been an input of this kind of interrupting request signal, information indicating a current condition of the arc tube 1, such as a current cumulative lit time, and a voltage currently being supplied to the arc tube 1, is recorded in the data storage portion 76, and a shift is made to the turning off operation.

If it is determined, in step S21, that the special operation should not be executed in the initial operation of the arc tube 1, the evaluating portion 75 retrieves the operational information of the immediately preceding lighting time of the light source unit 10 from the data storage portion 76, and determines whether or not the low level fusing operation should be executed in the initial operation of the arc tube 1 (step S41).

Specifically, in the event that it is determined that, at the immediately preceding lighting finishing point, as illustrated in FIG. 4A, the aging of the arc tube 1 has progressed, the concavities and convexities 61 and 63 have occurred, and it will be difficult as things stand to maintain the shape of the leading extremity 15a and the leading extremity side area 15g of the first electrode 15, it is determined that the low level fusing drive should be executed in the initial operation. In this step S41, it is also possible to determine whether or not the low level fusing drive should be executed depending on whether or not the voltage supplied to the arc tube 1 at the time of the steady operation before the immediately preceding lighting finish is as high as, or higher than, a voltage indicating the kind of condition illustrated in FIG. 4A, wherein the aging of the arc tube 1 has progressed, and a maintenance of the electrode leading extremity shape is needed. In the event that the aging of the arc tube 1 has progressed, and the leading extremities 15a and 16a of the first electrode 15 and the second electrode 16 have become difficult to fuse, it is also possible to arrange in such a way as to determine that a drive waveform which increases the temperature of the leading extremities 15a and 16a of each of the electrodes 15 and 16 (such as the current characteristics L12 and L13 of FIG. 6, the current characteristics L22 and L23 of FIG. 8, the current characteristics L31 and L33 of FIG. 10, the current characteristics L41 and L43 of FIG. 14, or the drive waveform of FIG. 16B) should be executed. By this means, it is possible to secure the volumes of the leading extremities 15a and 16a, and the fused portions 62 and 64 on the peripheries thereof.

Next, the evaluating portion 75, as an associated process of step S41, determines which of the first electrode 15 and the second electrode 16 to carry out the fusing drive for. Specifically, when the low level fusing drive has been executed the immediately preceding time, in the event that a first low level fusing drive, which fuses the leading extremity side (the leading extremity 15a etc.) of the first electrode 15 more than the leading extremity side (the leading extremity 16a etc.) of the second electrode 16, has been executed, the evaluating portion 75, as well as determining that a second low level fusing drive, which fuses the leading extremity side (the leading extremity 16a etc.) of the second electrode 16 more than the leading extremity side (the leading extremity 15a etc.) of the first electrode 15, should be executed as the low level fusing drive on the current occasion, stores this information in the data storage portion 76. That is, the evaluating portion 75, when carrying out the low level fusing drive, determines which, of the first low level fusing drive and the second low level fusing drive, to execute as the low level fusing drive corresponding to the current occasion, in order that the first low level fusing drive and the second low level fusing drive are carried out alternately.

If it is determined, in step S41, that the low level fusing drive should be executed as the initial operation of the arc tube 1, the controller 70b, in accordance with the evaluation result of step S41, retrieves a low level fusing drive power supply condition, among the power supply conditions of the initial operation, from the drive control table stored in the data storage portion 76 (step S42). Specifically, a setting value of a current value, a frequency, a duty ratio and the like, for the low level fusing drive are retrieved, and the setting value of the current value, the frequency, the triangular wave jump rate, the duty ratio and the like, for the regular steady drive are retrieved.

Next, the controller 70b, controlling the lighting device 70a based on the low level fusing drive power supply condition of the initial operation retrieved in step S42, controls the low level fusing drive of the initial operation, including the launching operation, from the starting of the arc tube 1 (step S43).

If it is determined, in step S21, that the special operation should not be executed in the initial operation of the arc tube 1, and furthermore, if it is determined, in step S41, that the low level fusing drive should not be executed in the initial operation of the arc tube 1, the evaluating portion 75 retrieves a regular initial drive power supply condition, among the power supply conditions of the initial operation, and retrieves a regular steady drive power supply condition, among the power supply conditions of the steady operation, from the drive control table stored in the data storage portion 76 (step S44). Specifically, a setting value of a current value, a frequency, a duty ratio and the like, for the regular initial drive are retrieved, and a setting value of a current value, a frequency, a triangular wave jump rate, a duty ratio and the like, for the regular steady drive are retrieved.

Next, the controller 70b, controlling the lighting device 70a based on the regular initial drive power supply condition of the initial operation retrieved in step S44, controls the regular initial drive of the initial operation, including the launching operation, from the starting of the arc tube 1 (step S45).

Next, after carrying out the low level fusing drive in step S43 or the regular initial drive in step S45, the controller 70b, controlling the lighting device 70a based on the regular steady drive power supply condition of the steady operation retrieved in step S42 or step S44, controls the regular steady drive of the steady operation of the arc tube 1 (step S46).

Herein, the evaluating portion 75 determines whether or not, during the steady operation, an interrupting request signal requesting the finish of the light source unit 10 lighting operation has been input (step S47). If it is determined that there has been no input of an interrupting request signal requesting the finish of the light source unit 10 lighting operation, the controller 70b returns to step S46, and continues the regular steady drive.

If there has been an input of an interrupting request signal in step S47, the information indicating the current condition of the arc tube 1, such as the current cumulative lit time, and the voltage currently being supplied to the arc tube 1, is recorded in the data storage portion 76, and a shift is made to the turning off operation.

As is clear from the above description, with the light source apparatus 100 of the embodiment, the controller 70b being able to operate with the fusing drive, with the fusing drive, at any timing during the initial operation, it makes the volumes of the fused portions 62 and 64 of the first electrode 15 or the second electrode 16 larger than the volumes of the fused portions of the leading edge side of the first electrode 15 or the second electrode 16 at the time of the rated drive during the steady operation. Therefore, the repair or the restoration of the electrodes 15 and 16 utilizing the lighting start period being possible, it is possible to suppress the occurrence of the flicker and the arc jump. Also, by maintaining the electrode leading extremity in a good shape, and keeping the illuminance of the light source apparatus high, it is possible to achieve a lengthening of a life span. According to the above, by increasing the fusion volume of the first electrode 15 or the second electrode 16 without interrupting the steady operation, it is possible to prevent a brightness of a source light or projection image from fluctuating after an actual start of use.

Projector

Figure 24:
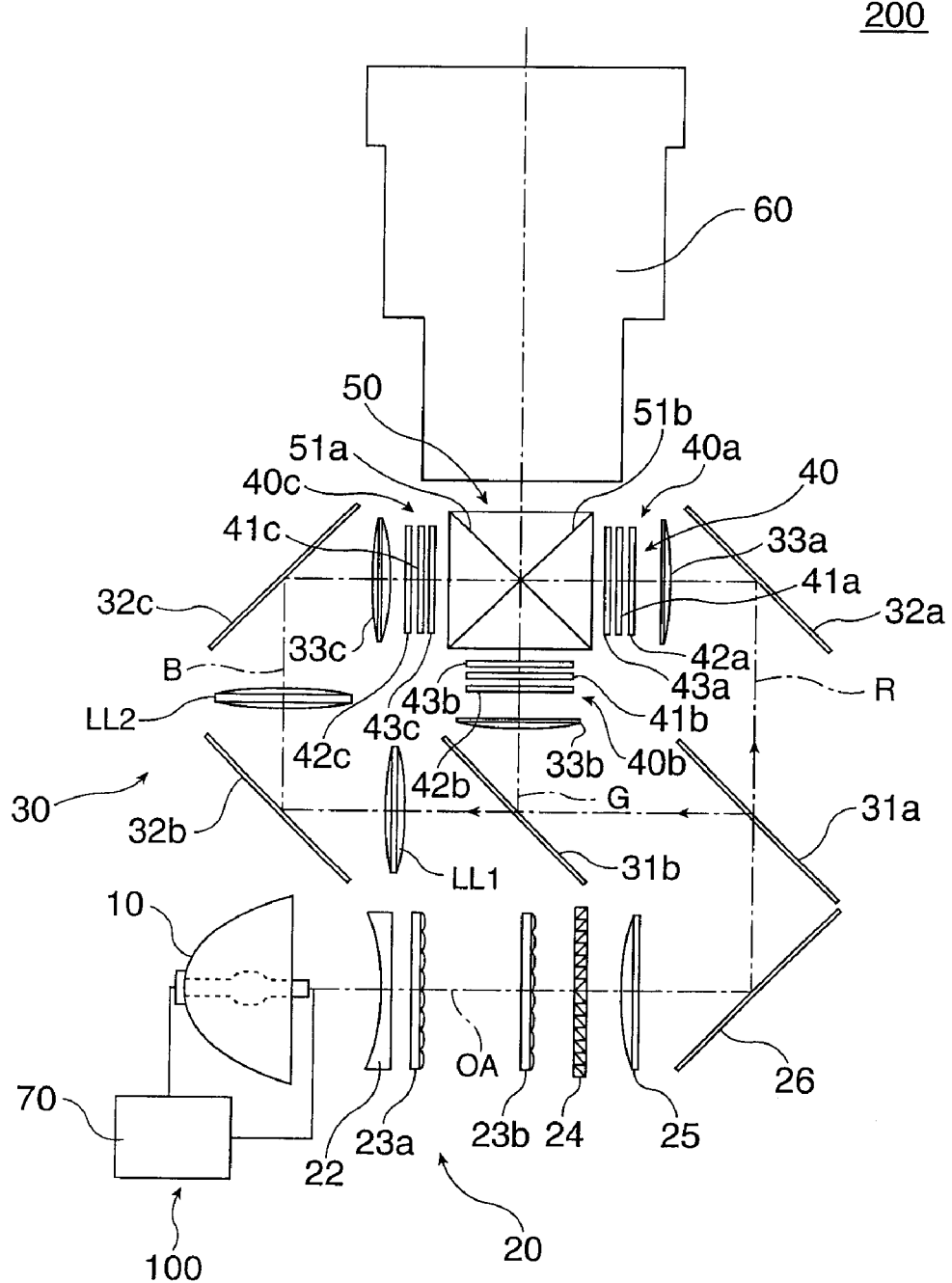
FIG. 24 is a diagram illustrating a projector in which the light source apparatus is embedded.

FIG. 24 is a conceptual diagram for illustrating a structure of a projector in which is embedded the light source apparatus 100 of FIG. 1. A projector 200 includes the light source apparatus 100, an illumination optical system 20, a color separating optical system 30, a light modulator 40, a cross dichroic prism 50, and a projection lens 60. Herein, the light modulator 40 includes three liquid crystal light bulbs 40a, 40b and 40c, which have identical structures.

In the heretofore described projector 200, the light source apparatus 100, including the light source unit 10 and the light source drive device 70 shown in FIG. 1, emits an illumination light for illuminating the light modulator 40, that is, the liquid crystal light bulbs 40a, 40b and 40c, via the illumination optical system 20, and the like.

The illumination optical system 20 including a parallelizing lens 22, which parallelizes a light flux direction of a source light, first and second fly-eye lenses 23a and 23b, which configure an integrated optical system for dividing and superimposing light, a polarization conversion element 24, which aligns a polarization direction of the light, a superposition lens 25, which superimposes light which has passed through the two fly-eye lenses 23a and 23b, and a mirror 26, which bends an optical path of the light, a homogenized illumination light of an approximately white color is formed thereby. In the illumination optical system 20, the parallelizing lens 22 converts a flux direction of an illumination light projected from the light source unit 10 so as to be approximately parallel. The first and second fly-eye lenses 23a and 23b being configured of a plurality of element lenses each of which is disposed in a matrix form, the light which has passed through the parallelizing lens 22 is divided and individually gathered by the element lenses which configure the first fly-eye lens 23a, while divided light fluxes from the first fly-eye lens 23a are projected at an appropriate angle of divergence by the element lenses which configure the second fly-eye lens 23b. The polarization conversion element 24, being formed of an array which makes a PBS, a mirror, a retarder, and the like, a single group of elements, has a function of arranging a polarization direction of each partial light flux divided by the first fly-eye lens 23a into a unidirectional linear polarization. The superposition lens 25 appropriately gathers, as a whole, illumination light which has passed through the polarization conversion element 24, enabling a superimposed illumination of an illumination area of the liquid crystal light bulbs 40a, 40b and 40c, which are variously colored light modulating devices of a latter stage.

The color separating optical system 30 including first and second dichroic mirrors 31a and 31b, reflecting mirrors 32a, 32b and 32c, and three field lenses 33a, 33b and 33c, as well as separating the illumination light homogenized by the illumination optical system 20 into three colors red (R), green (G) and blue (B), leads each colored light to the liquid crystal light bulbs 40a, 40b and 40c of the latter stage. To describe in more detail, firstly, the first dichroic mirror 31a transmits the R light, of the three colors RGB, and reflects the G light and the B light. Also, the second dichroic mirror 31b reflects the G light, of the two colors GB, and transmits the B light. Next, in the color separating optical system 30, the R light transmitted through the first dichroic mirror 31a falls incident, via the reflecting mirror 32a, on the field lens 33a, for adjusting an angle of incidence. Also, the G light, which is reflected by the first dichroic mirror 31a, and furthermore, is also reflected by the second dichroic mirror 31b, falls incident on the field lens 33b, for adjusting an angle of incidence. Furthermore, the B light which has passed through the second dichroic mirror 31b falls incident, via relay lenses LL1 and LL2, and the reflecting mirrors 32b and 32c, on the field lens 33c, for adjusting an angle of incidence.

Each liquid crystal light bulb 40a, 40b and 40c configuring the light modulator 40 is a non-light emitting type of light modulating device which modulates a spatial intensity distribution of incident illumination light. The liquid crystal light bulbs 40a, 40b and 40c include three liquid crystal panels 41a, 41b and 41c, each of which is illuminated corresponding to each colored light projected from the color separating optical system 30, three first polarization filters 42a, 42b and 42c, which are respectively disposed on an incidence side of each liquid crystal panel 41a, 41b and 41c, and three second polarization filters 43a, 43b and 43c, which are respectively disposed on a projection side of each liquid crystal panel 41a, 41b and 41c. The R light transmitted through the first dichroic mirror 31a falls incident, via the field lens 33a etc., on the liquid crystal light bulb 40a, and illuminates the liquid crystal panel 41a of the liquid crystal light bulb 40a. The G light reflected by both the first and second dichroic mirrors 31a and 31b falls incident, via the field lens 33b etc., on the liquid crystal light bulb 40b, and illuminates the liquid crystal panel 41b of the liquid crystal light bulb 40b. The B light, which is reflected by the first dichroic mirror 31a and transmitted through the second dichroic mirror 31b, falls incident, via the field lens 33c etc., on the liquid crystal light bulb 40c, and illuminates the liquid crystal panel 41c of the liquid crystal light bulb 40c. Each liquid crystal panel 41a to 41c modulating the spatial intensity distribution of the polarization direction of the incident illumination light, the three colors of light falling incident respectively on the liquid crystal panels 41a to 41c have a polarization condition adjusted in pixel units in accordance with a drive signal or an image signal input into the liquid crystal panels 41a to 41c as an electrical signal. At this time, as well as the polarization direction of the illumination light falling incident on the liquid crystal panels 41a to 41c being adjusted by the first polarization filters 42a to 42c, modulated light of a predetermined polarization direction is removed from modulated light projected from the liquid crystal panels 41a to 41c by the second polarization filters 43a to 43c. According to the above, each liquid crystal light bulb 40a, 40b and 40c respectively forms an image light of a corresponding color.

The cross dichroic prism 50 synthesizes the colored image lights from the liquid crystal light bulbs 40a, 40b and 40c. To describe in more detail, the cross dichroic prism 50 forming an approximate square, in a planar view, in which four orthogonal prisms are stuck together, a pair of dielectric multilayer films 51a and 51b intersecting in an X shape are formed at an interface where the orthogonal prisms are stuck together. One first dielectric multilayer film 51a reflects the R light, while the other second dielectric multilayer film 51b reflects the B light. The cross dichroic prism 50 reflects the R light from the liquid crystal light bulb 40a with the dielectric multilayer film 51a, projecting it on a travel direction right side, projects the G light from the liquid crystal light bulb 40b straight ahead through the dielectric multilayer films 51a and 51b, and reflects the B light from the liquid crystal light bulb 40c with the dielectric multilayer film 51b, projecting it on a travel direction left side. By so doing, the R light, G light and B light are synthesized by the cross dichroic prism 50, and a synthesized light, which is an image light consisting of color images, is formed.

The projection lens 60, being a projection optical system, enlarges the image light, consisting of the synthesized light formed via the cross dichroic prism 50, by a desired enlargement rate, and projects a color image onto a screen (not shown).

The invention, not being limited to the heretofore described embodiment, can be embodied in various aspects without departing from the scope thereof with, for example, the following kinds of modification also being possible.

For example, in the heretofore described embodiment, as a lamp used in the light source unit 10, various kinds of article, such as a high pressure mercury lamp or a metal halide lamp, can be considered.

Also, in the projector 200 of the heretofore described embodiment, the pair of fly-eye lamps 23a and 23b are used to divide the light from the light source apparatus 100 into a plurality of partial luminous fluxes, but the invention can also be applied to a projector which does not use this kind of fly-eye lens, that is, a lens array. Furthermore, it is also possible to replace the fly-eye lenses 23a and 23b with a rod integrator.

Also, in the heretofore described projector 200, the polarization conversion element 24, which polarizes the light from the light source apparatus 100 in a specific direction, is used, but the invention can also be applied to a projector which does not use this kind of polarization conversion element 24.

Also, in the heretofore described embodiment, a description has been given of an example of a case in which the invention is applied to a transmission type projector, but the invention can also be applied to a reflection type projector. Herein, "transmission type" means that it is a type wherein a liquid crystal light bulb, including a liquid crystal panel and the like, transmits light, while "reflection type" means that it is a type wherein a liquid crystal light bulb reflects light. It is also acceptable that a light modulating device, not being limited to a liquid crystal panel or the like, is a light modulating device using, for example, a micromirror.

Also, as a projector, there are a front screen projector, which carries out an image projection from a direction in which a projection screen is viewed, and a back screen projector, which carries out an image projection from a side opposite to the direction in which the projection screen is viewed, but the configuration of the projector shown in FIG. 24 can be applied to either.

Also, in the heretofore described embodiment, only the example of the projector 200 using the three liquid crystal panels 41a to 41c is given, but the invention can also be applied to a projector using only one liquid crystal panel, a projector using two liquid crystal panels, or a projector using four or more liquid crystal panels.

Also, in the heretofore described embodiment, the modulation of each colored light is carried out using the color separating optical system 30, the liquid crystal light bulbs 40a, 40b and 40c, and the like but, instead of this, it is also possible to carry out the modulation and synthesis of the colored lights by using, for example, a combination of a color foil illuminated by the light source apparatus 100 and the illumination optical system 20, and a device, configured of pixels of a micromirror, irradiated with light transmitted through the color foil.

What is claimed is:

1. A light source apparatus comprising:
  an arc tube including a first electrode and a second electrode that carry out an emission of light due to a discharge between them; and
  a drive unit that operates in at least two operation modes, including: (i) a steady operation mode; and (ii) an initial operation mode before operating in the steady operation mode, the initial operation mode including a fusing drive;
  during the steady operation mode, the drive unit supplying a steady energy in an alternating current to the first electrode and the second electrode;
  during the initial operation mode, the drive unit supplying energy in an alternating current to the first electrode and the second electrode such that a cumulative energy in an anode period of at least one of the first electrode and the second electrode is greater than a cumulative energy in an anode period of the corresponding electrode during the steady operation mode; and
  the drive unit, in a launching operation period including at least a period immediately before switching to the steady operation mode, during the time of the fusing drive of the initial operation mode, increasing a value of a current supplied to the at least one of the first electrode and the second electrode as time elapses.

2. The light source apparatus according to claim 1, further comprising:
  an evaluating portion that determines a degree of erosion of the arc tube,
  the drive unit, at the time of the fusing drive of the initial operation mode, increasing a rate of increase of the value of the current supplied to the at least one of the first electrode and the second electrode during the launching operation period, in accordance with the degree of erosion determined by the evaluating portion.

3. A light source apparatus comprising:
an arc tube including a first electrode and a second electrode that carry out an emission of light due to a discharge between them; and
a drive unit that operates in at least two operation modes, including: (i) a steady operation mode; and (ii) an initial operation mode before operating in the steady operation mode, the initial operation mode including a fusing drive;
during the steady operation mode, the drive unit supplying a steady energy in an alternating current to the first electrode and the second electrode;
during the initial operation mode, the drive unit supplying energy in an alternating current to the first electrode and the second electrode such that a cumulative energy in an anode period of at least one of the first electrode and the second electrode is greater than a cumulative energy in an anode period of the corresponding electrode during the steady operation mode; and
the drive unit, at the time of the fusing drive of the initial operation mode, increasing a value of a current supplied to the at least one of the first electrode and the second electrode at an end of a launching operation provided after a start of the initial operation.

4. The light source apparatus according to claim 3,
the drive unit, at the time of the fusing drive of the initial operation mode, in the event that a voltage between the first electrode and the second electrode reaches a predetermined voltage value, temporarily increasing the value of the current supplied to the at least one of the first electrode and the second electrode compared with that before reaching the predetermined voltage value.

5. The light source apparatus according to claim 3, further comprising:
an evaluating portion that determines a degree of erosion of the arc tube,
the drive unit, at the time of the fusing drive of the initial operation mode, increases the value of the current supplied to the at least one of the first electrode and the second electrode at the end of the launching operation period, in accordance with the degree of erosion determined by the evaluating portion.

6. The light source apparatus according to claim 1,
the drive unit, as an aspect of the fusing drive of the initial operation mode, is capable of carrying out, for one fusing drive, either one of a first fusing drive, which melts the leading extremity side of the first electrode more than the leading extremity side of the second electrode, or a second fusing drive, which melts the leading extremity side of the second electrode more than the leading extremity side of the first electrode, and
the drive unit, by carrying out the second fusing drive as a fusing drive of a current initial operation in the event that the first fusing drive has been carried out as a fusing drive of an immediately preceding initial operation, and carrying out the first fusing drive as the fusing drive of the current initial operation in the event that the second fusing drive has been carried out as the fusing drive of the immediately preceding initial operation, alternately makes the first electrode and the second electrode a main fusion subject.

7. The light source apparatus according to claim 3,
the drive unit, as an aspect of the fusing drive of the initial operation mode, is capable of carrying out, for one fusing drive, either one of a first fusing drive, which melts the leading extremity side of the first electrode more than the leading extremity side of the second electrode, or a second fusing drive, which melts the leading extremity side of the second electrode more than the leading extremity side of the first electrode, and
the drive unit, by carrying out the second fusing drive as a fusing drive of a current initial operation in the event that the first fusing drive has been carried out as a fusing drive of an immediately preceding initial operation, and carrying out the first fusing drive as the fusing drive of the current initial operation in the event that the second fusing drive has been carried out as the fusing drive of the immediately preceding initial operation, alternately makes the first electrode and the second electrode a main fusion subject.

8. A projector comprising:
the light source apparatus according to claim 1;
a light modulating device illuminated by an illumination light from the light source apparatus; and
a projection optical system that projects an image formed by the light modulating device.

9. A projector comprising:
the light source apparatus according to claim 3;
a light modulating device illuminated by an illumination light from the light source apparatus; and
a projection optical system that projects an image formed by the light modulation device.

* * * * *